(12) United States Patent
Wittek et al.

(10) Patent No.: US 10,138,420 B2
(45) Date of Patent: Nov. 27, 2018

(54) POLYMERISABLE MESOGENIC COMPOUND, LIQUID CRYSTAL MEDIUM AND LIQUID CRYSTAL DISPLAY

(71) Applicant: Merck Patent GmbH, Darmstadt (DE)

(72) Inventors: Michael Wittek, Erzhausen (DE); Norihiko Tanaka, Kawagoe (JP); Kevin Adlem, Bournemouth (GB); Matthias Bremer, Darmstadt (DE); David Wilkes, Darmstadt (DE); Ming-Chou Wu, Zhongli (TW)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/501,520

(22) PCT Filed: Jul. 17, 2015

(86) PCT No.: PCT/EP2015/001480
§ 371 (c)(1),
(2) Date: Feb. 3, 2017

(87) PCT Pub. No.: WO2016/020040
PCT Pub. Date: Feb. 11, 2016

(65) Prior Publication Data
US 2017/0226422 A1    Aug. 10, 2017

(30) Foreign Application Priority Data

Aug. 5, 2014   (EP) .................................... 14002739

(51) Int. Cl.
| G02F 1/1333 | (2006.01) |
| C09K 19/46  | (2006.01) |
| C09K 19/38  | (2006.01) |
| C09K 19/34  | (2006.01) |
| C09K 19/58  | (2006.01) |
| C09K 19/02  | (2006.01) |
| C09K 19/04  | (2006.01) |

(52) U.S. Cl.
CPC .......... C09K 19/46 (2013.01); C09K 19/0275 (2013.01); C09K 19/3402 (2013.01); C09K 19/3809 (2013.01); C09K 19/588 (2013.01); C09K 2019/0448 (2013.01); C09K 2019/0466 (2013.01); C09K 2019/3422 (2013.01)

(58) Field of Classification Search
CPC  C09K 19/46; C09K 19/3809; C09K 19/3402; C09K 19/588; C09K 19/0275; C09K 2019/3422; C09K 2019/0448; C09K 2019/0466
USPC ....................................................... 252/299.5
See application file for complete search history.

(56) References Cited

U.S. PATENT DOCUMENTS

| 6,596,193 B2 | 7/2003 | Coates et al. |
| 7,440,160 B2 | 10/2008 | Heckmeier |
| 7,914,859 B2 | 3/2011 | Kirsch et al. |
| 8,895,117 B2 | 11/2014 | Jansen et al. |
| 9,133,395 B2 * | 9/2015 | Taugerbeck ....... C09K 19/3001 |
| 9,347,000 B2 | 5/2016 | Jansen et al. |
| 2006/0050354 A1 | 3/2006 | Heckmeier et al. |
| 2008/0116419 A1 | 5/2008 | Kirsch et al. |
| 2011/0261311 A1 | 10/2011 | Jansen et al. |
| 2014/0008570 A1 | 1/2014 | Taugerbeck et al. |
| 2014/0362334 A1 | 12/2014 | Jansen et al. |

FOREIGN PATENT DOCUMENTS

| EP | 1816180 A1 | 8/2007 |
| EP | 2380945 A1 | 10/2011 |
| EP | 2682448 A2 | 1/2014 |
| WO | 2004/046805 A1 | 6/2004 |
| WO | 2006/061094 A1 | 6/2006 |
| WO | 2006/069618 A1 | 7/2006 |
| WO | 2006/079406 A1 | 8/2006 |

OTHER PUBLICATIONS

International Search Report dated Oct. 19, 2015 issued in corresponding PCT/EP2015/001480 application (4 pages).
Written Opinion of the International Searching Authority dated Oct. 19, 2015 issued in corresponding PCT/EP2015/001480 application (6 pages).

* cited by examiner

*Primary Examiner* — Geraldina Visconti
(74) *Attorney, Agent, or Firm* — Millen White Zelano and Branigan, PC

(57) ABSTRACT

The present invention relates to liquid crystal media comprising polymerizable mesogenic compounds with a bent shape, and to electro-optical displays comprising these media as light modulation media. In particular the electro-optical displays according to the present invention are displays, which are operated at a temperature, at which the liquid crystal modulation media are in an optically isotropic phase, preferably in a blue phase.

11 Claims, 1 Drawing Sheet

POLYMERISABLE MESOGENIC COMPOUND, LIQUID CRYSTAL MEDIUM AND LIQUID CRYSTAL DISPLAY

TECHNICAL FIELD

The present invention relates to liquid crystal media comprising polymerisable mesogenic compounds with a bent shape, and to electro-optical displays comprising these media as light modulation media. In particular the electro-optical displays according to the present invention are displays, which are operated at a temperature, at which the liquid crystal modulation media are in an optically isotropic phase, preferably in a blue phase.

BACKGROUND

Electro-optical displays and mesogenic light modulation media are known, which are in the isotropic phase when being operated in the display (hereinafter referred to as "isotropic mode displays"). Such displays and media are for example described in DE 102 17 273 A. Furthermore, electro-optical displays and mesogenic light modulation media are known, which are in the optically isotropic blue phase, when being operated in the display (hereinafter referred to as "blue mode displays"). Such displays and media are for example described in WO 2004/046 805.

Blue mode and isotropic mode displays provide several significant advantages compared to well-known and widely used displays using liquid crystals in the nematic phase, like for example liquid crystal displays (LCDs) operating in the twisted nematic (TN)-, the super twisted nematic (STN)-, the electrically controlled birefringence (ECB)-mode with its various modifications and the in-plane switching (IPS)-mode. Amongst these advantages are most pronounced their much faster switching times, and significantly wider optical viewing angle.

Whereas, compared to displays using mesogenic media in another liquid crystalline phase, as e.g. in the smectic phase in surface stabilized ferroelectric liquid crystal displays (SSF LCDs), the blue mode and isotropic mode displays of DE 102 17 273 A and WO 2004/046 805 are much easier to manufacture. For example, they do not require a very thin cell gap and in addition the electro-optical effect is not very sensitive to small variations of the cell gap.

However, the liquid crystal media that are commonly used in these blue mode and isotropic mode displays mentioned still require operating voltages, which are not low enough for some applications. Further the operating voltages of these media vary with temperature, and it is generally observed, that at a certain temperature the voltage dramatically increases with increasing temperature. This limits the applicability of liquid crystal media in the blue phase for display applications. A further disadvantage of the liquid crystal media described in the above cited documents is their moderate reliability which is insufficient for very demanding applications. This moderate reliability may be for example expressed in terms of the voltage holding ratio (VHR) parameter, which in liquid crystal media as described above may be below 90%.

Some compounds and compositions have been reported which possess a blue phase between the cholesteric phase and the isotropic phase that can usually be observed by optical microscopy. These compounds or compositions for which the blue phases are observed are typically single mesogenic compounds or mixtures showing a high chirality. However, generally the blue phases observed only extend over a very small temperature range, which is typically less than 1 degree centigrade wide, and/or the blue phase is located at rather inconvenient temperatures.

In order to operate the novel fast switching display mode of WO 2004/046 805 the light modulation medium to be used has to be in the blue phase over a broad range of temperatures encompassing ambient temperature, however. Thus, a light modulation medium possessing a blue phase, which is as wide as possible and conveniently located is required.

Therefore there is a strong need for a modulation medium with a blue phase with a wide phase range, which may be achieved either by an appropriate mixture of mesogenic compounds themselves or, preferably by mixing a host mixture with appropriate mesogenic properties with a single dopant or a mixture of dopants that stabilises the blue phase over a wide temperature range.

Summarizing, there is a need for liquid crystal media, which can be operated in liquid crystal displays, which are operated at temperatures where the media is in the blue phase, which provide the following technical improvements:
a reduced operating voltage,
a reduced temperature dependency of the operating voltage and
an improved reliability, e.g. VHR.

It was an aim of the present invention to provide liquid crystal media suitable for use in blue mode or isotropic mode displays and provide one or more of the above-mentioned technical improvements. Another aim of the invention was to extend the pool of liquid crystal media available to the expert. Other aims of the present invention are immediately evident to the expert from the following detailed description.

The inventors of the present invention have found that one or more of the above aims can be achieved by providing liquid crystal media as described and claimed hereinafter, which comprise one or more polymerisable mesogenic compounds or reactive mesogens (RMs) with a bent core.

Such compounds with a bent core, also known as "banana shaped" compounds, have been disclosed in prior art, for example in U.S. Pat. No. 6,596,193 as components of polymer dispersed LC displays. However, they have hitherto not been disclose or suggested for use in blue mode or isotropic mode displays.

Surprisingly, it has been found that the addition of such polymerisable mesogenic compounds or RMs with a bent core to mesogenic media exhibiting a blue phase results in the formation of a blue phase that has a wide process window >1.5° C. over which polymerisation can take place and a blue phase with a low switching hysteresis <2V.

Nematic liquid crystals doped with bent-shaped molecules having a blue phase have been reported by Z. Zheng et al., Journal of Physics 12 (2010), 113018.

The use of polymer stabilization to enhance the temperature range of a blue phase has been reported in T. Iwata et al., Mol. Cryst. Liq. Cryst. 470, 11-18.

WO 2006/061094 A1, WO 2006/069618 A1, WO 2006/079406 A1 and EP 1 816 180 disclose bent-shaped, non-reactive mesogenic compounds and their use in blue mode displays.

However, none of the above-cited documents discloses or suggests the use of bent-shaped polymerisable compounds or RMs in blue mode displays.

SUMMARY

The invention relates to a liquid crystal medium, preferably exhibiting a blue phase, and comprising a compound of formula I $$P^1\text{-}Sp^1\text{-}(A^1\text{-}Z^1)_a\text{---}B\text{---}(Z^2\text{-}A^2)_b\text{-}Sp^2\text{-}P^2 \qquad\qquad I$$

wherein $P^1$, $P^2$ independently of each other denote a polymerisable group, $Sp^1$, $Sp^2$ independently of each other denote a spacer group or a single bond, B is phenylene-1,2-diyl or phenylene-1,3-diyl, which is optionally substituted with one or more groups L, $A^1$, $A^2$ independently of each other, and on each occurrence identically or differently, denote an aromatic, heteroaromatic, alicyclic or heterocyclic group having 4 to 25 C atoms, which may also contain fused rings, and which is optionally mono- or polysubstituted by L, $Z^1$, $Z^2$ denotes, on each occurrence identically or differently, —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_n$—, —CF$_2$CH$_2$—, —CH$_2$CF$_2$—, —(CF$_2$)$_n$—, —CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —CR$^{00}$R$^{000}$—, or a single bond, L denotes $P^1$—, $P^1$-$Sp^1$-, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl or heteroaryl having 5 to 20 ring atoms, or straight-chain or branched alkyl having 1 to 25, particularly preferably 1 to 10, C atoms, in which, in addition, one or more non-adjacent CH$_2$ groups may each be replaced, independently of one another, by —C(R$^{00}$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, $P^1$ or $P^1$-$Sp^1$-, $R^{00}$ and $R^{000}$ each, independently of one another, denote H or alkyl having 1 to 12 C atoms, $Y^1$ is halogen, $R^x$ denotes $P^1$, $P^1$-$Sp^1$-, H, halogen, straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, $P^1$— or $P^1$-$Sp^1$-, optionally substituted aryl, aryloxy, heteroaryl or heteroaryloxy having 5 to 20 ring atoms, a is 1, 2 or 3, b is 1, 2 or 3, n is 1, 2, 3 or 4.

The invention further relates to a method of stabilisation of a liquid crystal mesogenic medium as described above and below by polymerisation of its polymerisable compounds.

The invention further relates to a liquid crystal medium as described above and below which is stabilised by polymerisation of its polymerisable constituents.

The invention further relates to the use of a liquid crystal medium as described above and below in a light modulation element or electro-optical display.

The invention further relates to a light modulation element or electro-optical display, which comprises a liquid crystal medium as described above and below, and which is preferably operated at a temperature, at which the liquid crystal medium is in an optically isotropic phase, preferably in a blue phase.

DETAILED DESCRIPTION

Figure 1:
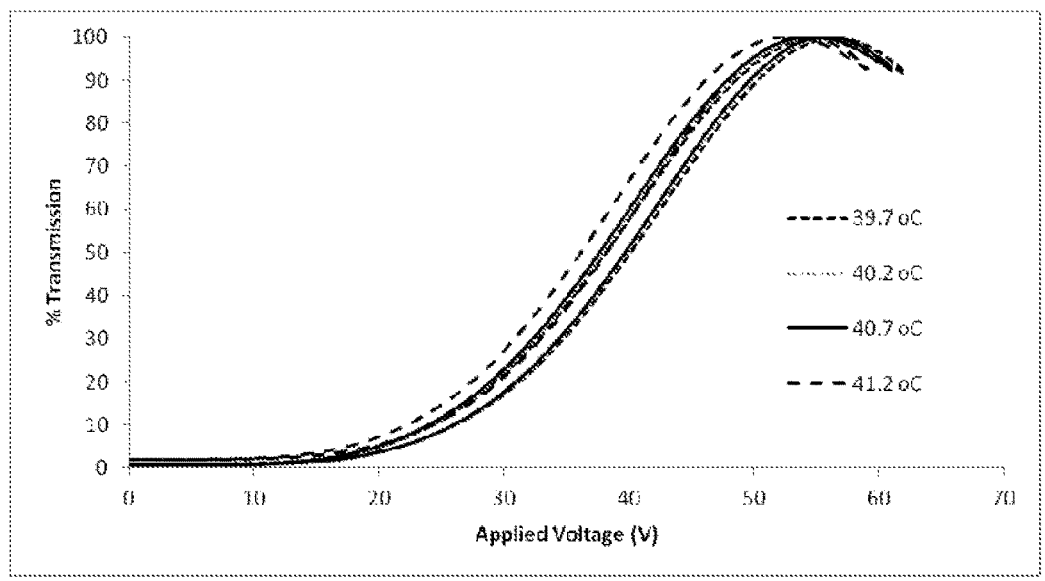
FIG. 1 shows the V-T-curve for a liquid crystal medium according to Example 1 at various polymerisation temperatures.

In order to produce a blue phase display it is necessary to have good temperature control across the entire panel as the performance of the blue phase mixture is dependent upon the polymerisation temperature. Typical temperature control requirements are +/−0.5 degrees over the entire panel. The addition of bent core compounds of formula I can stabilise the blue phase over a wider temperature range.

The bent core compounds of formula I diffuse through the blue phase lattice to the disclinations between the double twist cylinders. This lowers the free energy of the system. By polymerising the bent core compounds the blue phase lattice can be polymer stabilised to an even wider temperature range (to below room temperature). As the polymerisable molecules are located in the disclinations rather than evenly distributed throughout the phase the polymerisation should be faster and result in short processing time As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", hereinafter also referred to as "Sp", as used herein is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

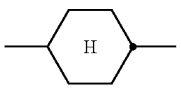

denotes a trans-1,4-cyclohexylene ring, and

denotes a 1,4-phenylene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxy-carbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 15 C atoms, in which, in addition, one or more non-adjacent C atoms may be replaced by —O—, —S—, —CO—, —CO—O—, —O—CO—, —O—CO—O— and in which one or more H atoms may be replaced by fluorine, an optionally substituted aryl or aryloxy group having 6 to 30 C atoms, or an optionally substituted heteroaryl or heteroaryloxy group having 2 to 30 C atoms.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1''']terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]-thiophene, thieno[3,2b] thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "L", are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ has the meaning indicated above and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

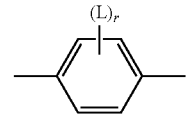

is preferably or

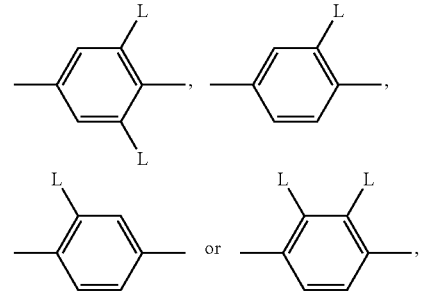

in which L has one of the meanings indicated above.

The polymerisable group $P^{1-3}$ is a group which is suitable for a polymerisation reaction, such as, for example, free-radical or ionic chain polymerisation, polyaddition or polycondensation, or for a polymer-analogous reaction, for example addition or condensation onto a main polymer chain.

Particular preference is given to groups for chain polymerisation, in particular those containing a C=C double bond or —C≡C— triple bond, and groups which are suitable for polymerisation with ring opening, such as, for example, oxetane or epoxide groups.

Preferred groups $P^{1-3}$ are selected from the group consisting of $CH_2$=$CW^1$—CO—O—, $CH_2$=$CW^1$—CO—,

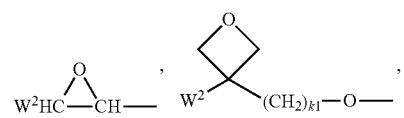

-continued

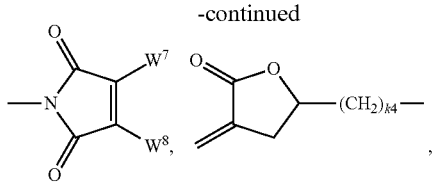

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH-, HOOC-, OCN- and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonyl-alkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P^{1-3}$ are selected from the group consisting of $CH_2=CW^1-CO-O-$, $CH_2=CW^1-CO-$,

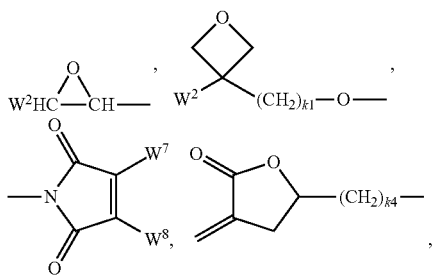

$CH_2=CW^2-O-$, $CH_2=CW^2-$, $CW^1-CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH- and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonyl-alkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P^{1,2}$ are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

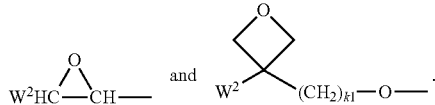

Further preferred polymerisable groups $P^{1-3}$ are selected from the group consisting of vinyl, vinyloxy, acrylate, methacrylate, fluoroacrylate, chloroacrylate, oxetane and epoxide groups, very preferably from acrylate and methacrylate groups.

If the spacer groups $Sp^{1,2}$ are different from a single bond, they are preferably of the formula Sp"-X", so that the respective radical $P^i$-$Sp^i$-, like for example $P^1$-$Sp^1$-, conforms to the formula P-Sp"-X"—, where Sp" and X" have the meanings given below.

Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N(R$^o$)—, —Si(R$^{oo}$R$^{ooo}$)—, —CO—, —CO—O—, —O—CO—, —O—CO—O—, —S—CO—, —CO—S—, —N(R$^{oo}$)—CO—O—, —O—CO—N(R$^{oo}$)—, —N(R$^{oo}$)—CO—N(R$^{oo}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^{oo}$)—, —N(R$^{oo}$)—CO—, —N(R$^{oo}$)—CO—N(R$^{oo}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^o$—, —CY$^2$=CY$^3$—, —C≡C—, —CH=CH—CO—O—, —O—CO—CH=CH— or a single bond, R$^{oo}$ and R$^{ooo}$ each, independently of one another, denote H or alkyl having 1 to 12 C atoms, and $Y^2$ and $Y^3$ each, independently of one another, denote H, F, Cl or CN.

X" is preferably —O—, —S—, —CO—, —COO—, —OCO—, —O—COO—, —CO—NR$^o$—, —NR$^o$—CO—, —NR$^o$—CO—NR$^o$— or a single bond.

Typical spacer groups -Sp"-X"— are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{oo}$R$^{ooo}$—O)$_{p1}$—, in which p1 is an integer from 1 to 12, q1 is an integer from 1 to 3, and R$^{oo}$ and R$^{ooo}$ have the meanings indicated above.

Particularly preferred groups -Sp"-X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups —X"-Sp"— are —(CH$_2$)$_{p1}$—, —O—(CH$_2$)$_{p1}$—, —CO—O—(CH$_2$)$_{p1}$—, —O—CO—O—(CH$_2$)$_{p1}$—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Preferred compounds of formula I are those in which $A^1$, $A^2$ each, independently of one another, denote 1,4-phenylene, naphthalene-1,4-diyl or naphthalene-2,6-diyl, where one or more CH groups in these groups are optionally replaced by N, cyclohexane-1,4-diyl, in which, in addition, one or more non-adjacent $CH_2$ groups are optionally replaced by O and/or S, 1,4-cyclohexenylene, bicyclo[1.1.1]pentane-1,3-diyl, bicyclo-[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl, anthracene-2,7-diyl, fluorene-2,7-diyl, phenanthrene-2,7-diyl or 9,10-dihydro-phenanthrene-2,7-diyl, where all these groups are unsubstituted or mono- or polysubstituted by L.

Preferred compounds of formula I are selected from formula I1

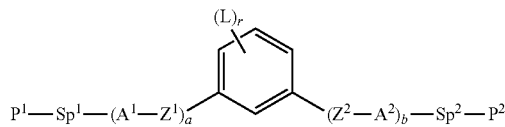

I1 wherein $P^1$, $P^2$, $Sp^1$, $Sp^2$, $A^1$, $A^2$, $Z^1$, $Z^2$, L, a and b are as defined in formula I and r is 1, 2 or 3.

Very preferred compounds of formula I and 11 are selected from the following subformulae

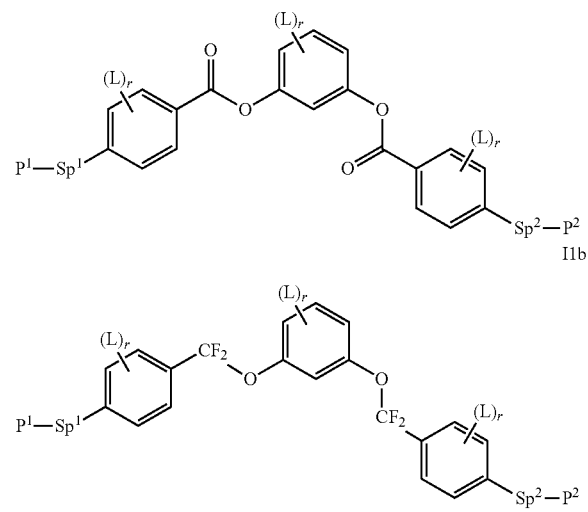

I1a

I1b wherein $P^1$, $P^2$, $Sp^1$, $Sp^2$, L and r are as defined in formula I1.

Further preferred compounds of formula I, 11 and their subformulae are those in which
 a is 1,
 b is 1,
 $P^1$ and $P^2$ are selected from the group consisting of acrylate, methacrylate and oxetane,
 $Sp^1$ and $Sp^2$ denote —$(CH_2)_{p1}$—, in which p1 is an integer from 1 to 6,
 B is phenylene-1,3-diyl which is optionally substituted by one or more groups L,
 $A^1$ and $A^2$ are selected from the group consisting of 1,4-phenylene, naphthalene-2,6-diyl, phenanthrene-2,7-diyl and 9,10-dihydro-phenanthrene-2,7-diyl, where, in addition, one or two CH groups in these rings are optionally replaced by N, and where these rings are optionally mono- or polysubstituted by L, as described above and below,
 $Z^1$ is selected from the group consisting of —O—, —CO—O—, —OCO—, —OCH$_2$—, —CH$_2$O—, —CF$_2$O—, —OCF$_2$—, —CH$_2$CH$_2$—, —CH=CH—, —CF=CF—, —CH=CF—, —CF=CH—, —C≡C—, and a single bond,
 $Z^1$ is —CO—O—, —OCO—, —CF$_2$O—, —OCF$_2$—, or a single bond,
 L is an unpolymerisable group, preferably selected from F, Cl, —CN and straight-chain or branched alkyl having 1 to 25, particularly preferably 1 to 10, C atoms, in which, in addition, one or more non-adjacent CH$_2$ groups may each be replaced, independently of one another, by —C($R^{00}$)=C($R^{00}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I or CN,
 r is 0,
 r is 1.

In a preferred embodiment of the present invention the liquid crystal media comprise, in addition to the compounds of formula I, one or more compounds of formula I-A

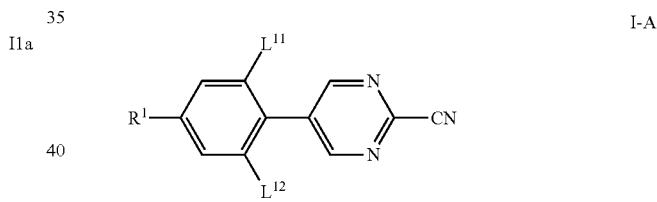

I-A wherein
 $R^1$ is alkyl, which is straight chain or branched, preferably has 1 to 20 C-atoms, is unsubstituted, mono- or polysubstituted by F, Cl or CN, preferably by F, and in which one or more CH$_2$ groups are optionally replaced, in each case independently from one another, by —O—, —S—, —NR$^{01}$—, —SiR$^{01}$R$^{02}$—, —CO—, —COO—, —OCO—, —OCO—O—, —S—CO—, —CO—S—, —CY$^1$=CY$^{02}$— or —C≡C— in such a manner that O and/or S atoms are not linked directly to one another, preferably n-alkyl or n-alkoxy with 1 to 9 C-atoms, preferably with 2 to 5 C-atoms, alkenyl, alkenyloxy or alkoxyalkyl with 2 to 9 C-atoms, preferably with 2 to 5 C-atoms or halogenated alkyl, halogenated alkenyl or halogenated alkoxy with preferably up to 9 C-atoms, preferably mono fluorinated, di-fluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms,
 $L^{11}$ and $L^{12}$ are, independently of each other, H or F, preferably one is F and the other H or F and most preferably both are F,
 $Y^{01}$ and $Y^{02}$ are, independently of each other, F, Cl or CN, and alternatively one of them may be H, and $R^{O1}$ and $R^{O2}$ are, independently of each other, H or alkyl with 1 to 12 C-atoms,
amongst which chiral compounds are encompassed, too.

In this preferred embodiment of the present invention the liquid crystal media preferably comprise one more compounds of formula I-A, preferably in a concentration of 1% to 15%, most preferably in a concentration of 2% to 8%.

In still a further preferred embodiment of the present invention the liquid crystal media comprise, additionally or alternatively to the compound or compounds of formula I-A, one more compounds of formula I-E

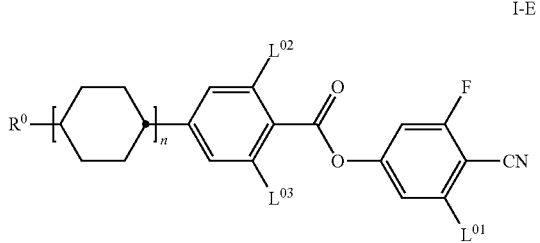

I-E $L^{01}$ to $L^{03}$ are independently of one another H or F, preferably $L^{01}$ is F and/or $L^{02}$ is F,
$R^O$ is alkyl, which is straight chain or branched, is unsubstituted, mono- or poly-substituted by F, Cl or CN, preferably by F, and in which one or more $CH_2$ groups are optionally replaced, in each case independently from one another, by —O—, —S—, —$NR^{O1}$—, —$SiR^{O1}R^{O2}$—, —CO—, —COO—, —OCO—, —OCO—O—, —S—CO—, —CO—S—, —$CY^{O1}$=$CY^{O2}$— or —C≡C— in such a manner that O and/or S atoms are not linked directly to one another,
$Y^{O1}$ and $Y^{O2}$ are, independently of each other, F, Cl or CN, and alternatively one of them may be H,
$R^{O1}$ and $R^{O2}$ are, independently of each other, H or alkyl with 1 to 12 C-atoms, and
n is 0 or 1.

In this preferred embodiment of the present invention the liquid crystal media preferably comprise one more compounds of formula I-E-1, preferably in a concentration of 2% to 15%,

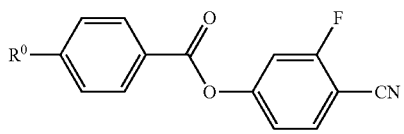

I-E-1 and/or one more compounds of formula I-E-2, preferably in a concentration of 4% to 20%,

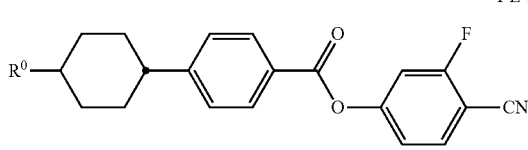

I-E-2 wherein $R^O$ has the meaning given under formula I-E above and preferably is n-alkyl, most preferably ethyl, n-propyl, n-butyl, n-pentyl, or n-hexyl or n-heptyl, most preferably ethyl or n-propyl.

The compounds selected from the group of formulae I-A and I-E constitute the optional third component, component C of the media according to the present application.

In this respective embodiment the liquid crystal media comprise all three components, components A to C, preferably in a total concentration from 15% or more, preferably from 20% or more to 50% or less, preferably to 45% or less.

In a preferred embodiment of the present invention the liquid crystal media comprise one more compounds of formula I-T

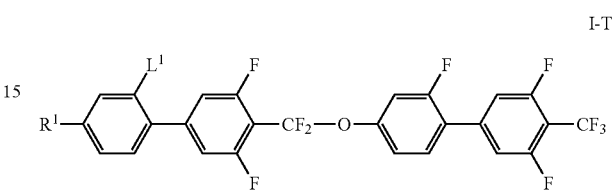

I-T wherein
$R^1$ has the meaning given under formula I-A above and
$L^1$ is H or F, preferably F.

In a preferred embodiment of the present invention the liquid crystal media comprise one more compounds of formula I-T selected from the group of compounds of formulae I-T-1 and I-T-2

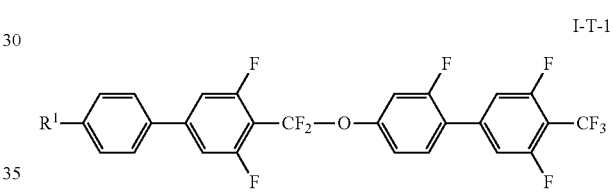

I-T-1

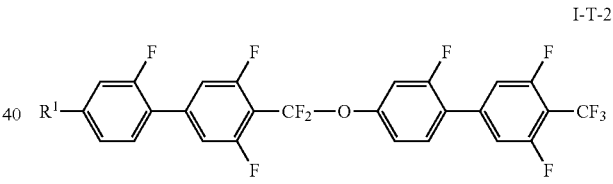

I-T-2 wherein
$R^1$ has the meanings given under formula I-T above and preferably is n-alkyl, most preferably ethyl, n-propyl, n-butyl, n-pentyl or n-hexyl.

In a further preferred embodiment of the present invention the liquid crystal media comprise one more compounds of formula I-N

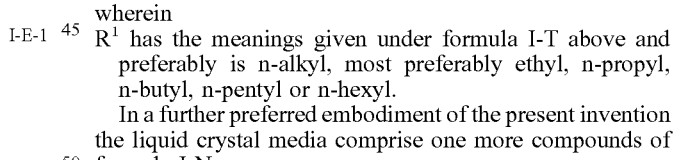

I-N wherein
$R^1$ has the meaning given under formula I-A above and
$L^1$ is H or F, preferably F.

In a further preferred embodiment of the present invention the liquid crystal media comprise one more compounds of formula I-N selected from the group of compounds of formulae I-N-1 and I-N-2

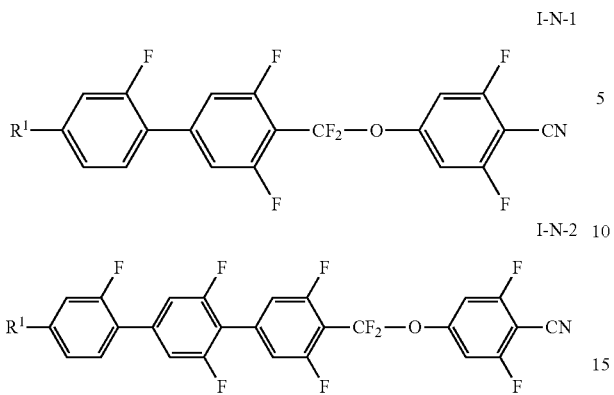

I-N-1

I-N-2 wherein
R¹ has the meanings given under formula I-N above and preferably is n-alkyl, most preferably ethyl, n-propyl, n-butyl, n-pentyl or n-hexyl.

It has been further been found that liquid crystal media, which are comprising, additionally to the compound or the compounds of formulae I-A, and/or I-T and/or I-N and/or I-E, or of their respective preferred subformulae, one or more compounds of formula II

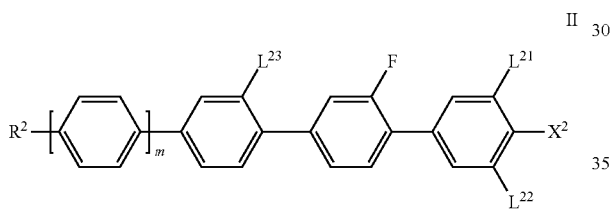

II wherein
m is 0 or 1
$L^{21}$ to $L^{23}$ are, independently of each other, H or F, preferably $L^{21}$ and $L^{22}$ are both F and/or $L^{23}$ is F,
$R^2$ is alkyl, which is straight chain or branched, preferably has 1 to 20 C-atoms, is unsubstituted, mono- or poly-substituted by F, Cl or CN, preferably by F, and in which one or more $CH_2$ groups are optionally replaced, in each case independently from one another, by —O—, —S—, —NR$^{01}$—, —SiR$^{01}$R$^{02}$—, —CO—, —COO—, —OCO—, —OCO—O—, —S—CO—, —CO—S—, —CY$^{01}$═CY$^{02}$— or —C≡C— in such a manner that O and/or S atoms are not linked directly to one another, preferably n-alkyl or n-alkoxy with 1 to 9 C-atoms, preferably with 2 to 5 C-atoms, alkenyl, alkenyloxy or alkoxyalkyl with 2 to 9 C-atoms, preferably with 2 to 5 C-atoms or halogenated alkyl, halogenated alkenyl or halogenated alkoxy with preferably up to 9 C-atoms, preferably mono fluorinated, di-fluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms,
$Y^{01}$ and $Y^{02}$ are, independently of each other, F, Cl or CN, and alternatively one of them may be H,
$R^{01}$ and $R^{02}$ are, independently of each other, H or alkyl with 1 to 12 C-atoms, and
$X^2$ is F or $CF_3$,
amongst which chiral compounds are encompassed, too, allow to realize media with an acceptably high clearing point and/or a rather high stability of the voltage holding ratio against temperature and/or UV-load and in particular against the latter.

Preferably the compounds of formula II are selected from the group of compounds of formulae II-1 and II-2

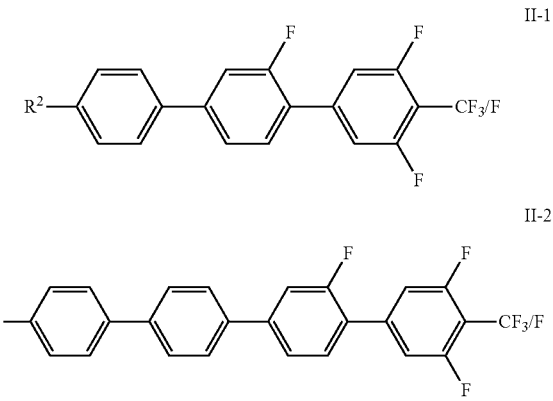

II-1

II-2 wherein $R^2$ and $X^2$ have the respective meanings given under formula II above and the polar terminal group $X^2$ in formula II-1 preferably is $CF_3$ and in formula II-2 it preferably is F.

In a preferred embodiment of the present invention the media according to the present invention additionally comprise one more compounds of formula III

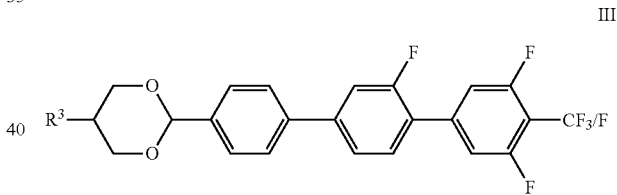

III wherein R has the meaning given for R under formula I-A above and the polar end group preferably is F.

In a preferred embodiment of the present invention the liquid crystal media comprise one more compounds of formula III, preferably one or more compounds wherein $R^3$ has the meaning given under formula III above and more preferably is n-alkyl, more preferably ethyl, n-propyl, n-butyl, n-pentyl or n-hexyl and, most preferably n-butyl.

Preferably the media according to the present invention additionally comprise one more compounds selected from the group of compounds of formulae IV and V

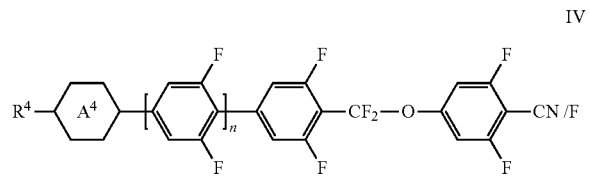

IV

-continued

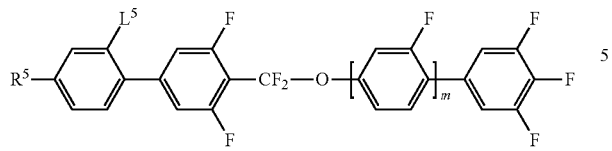

wherein

R⁴ and R⁵ are, independently of each other, alkyl, which is straight chain or branched, preferably has 1 to 20 C-atoms, is unsubstituted, mono- or poly-substituted by F, Cl or CN, preferably by F, and in which one or more $CH_2$ groups are optionally replaced, in each case independently from one another, by —O—, —S—, —CO—, —COO—, —OCO—, —OCO—O—, —S—CO—, —CO—S— or —C≡C— in such a manner that O and/or S atoms are not linked directly to one another, preferably n-alkyl or n-alkoxy with 1 to 9 C-atoms, preferably 2 to 5 C-atoms, alkenyl, alkenyloxy or alkoxyalkyl with 2 to 9 C-atoms, preferably with 2 to 5 C-atoms, most preferably n-alkyl, n-alkoxy, alkenyl, alkenyloxy or alkoxyalkyl with preferably up to 9 C-atoms, $L^5$ is H or F, preferably F,

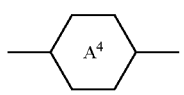

is

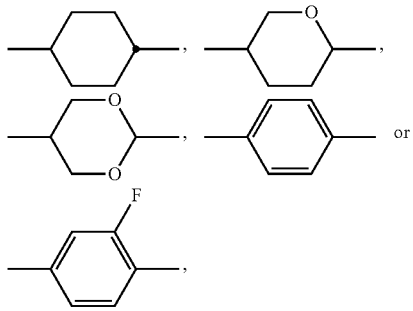

preferably

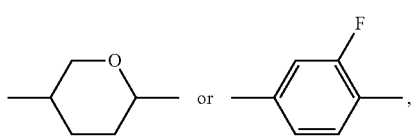

and n and m are, independently of one another, 0 or 1, preferably m is 1.

In a preferred embodiment of the present invention the liquid crystal media comprise one more compounds of formula II, preferably selected from the group of compounds of its sub-formulae II-1 to II-8, preferably of formula II-1 to II-4, most preferably of formula II-3,

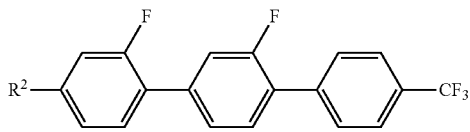

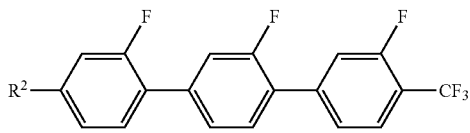

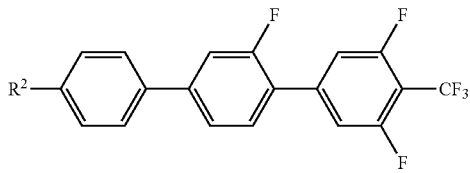

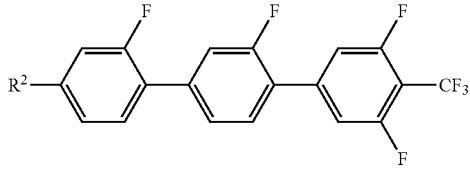

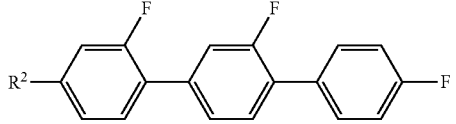

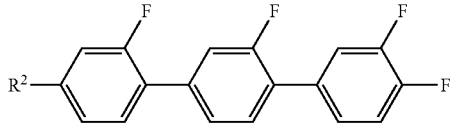

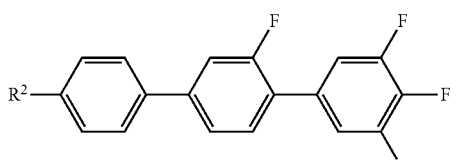

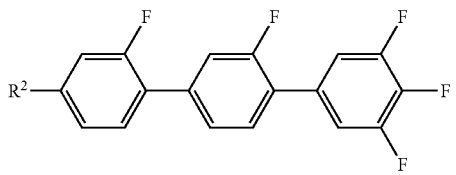

wherein $R^2$ has the meaning given under formula II above and preferably is n-butyl or n-pentyl.

In a preferred embodiment of the present invention the liquid crystal media comprise one more compounds of formula IV, preferably selected from the group of compounds of its sub-formulae IV-1 to IV-4, preferably of formulae IV-3 and/or IV-4,

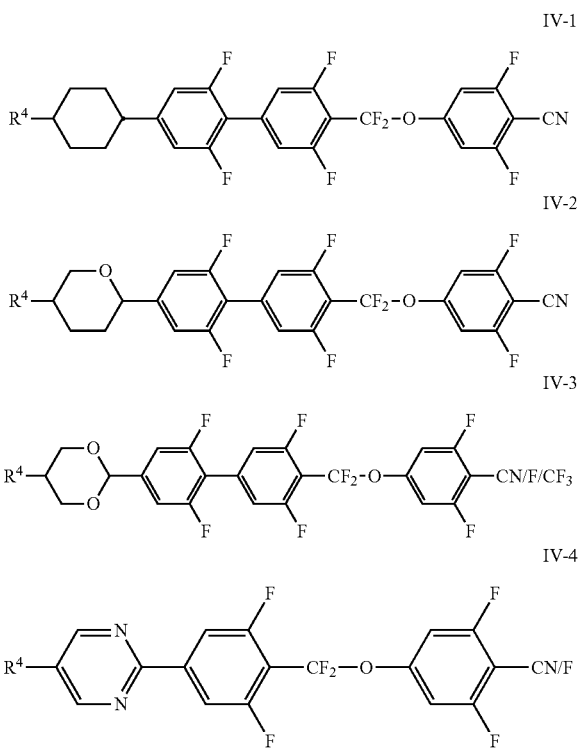

wherein R⁴ has the meaning given under formula IV above.

In a preferred embodiment of the present invention the liquid crystal media comprise one more compounds of formula V, preferably selected from the group of compounds of its sub-formulae V-1 and V-2, preferably one or more compounds of formula V-1 and one or more compounds of formula V-2,

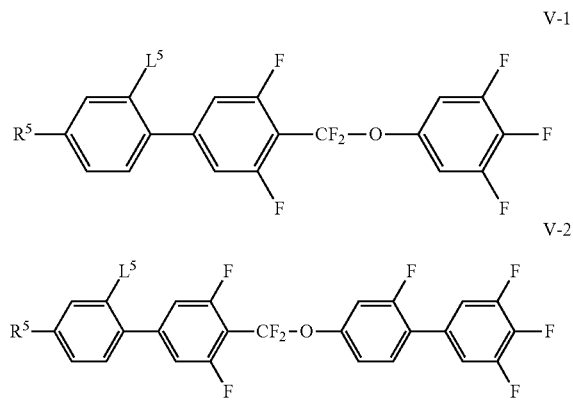

wherein R⁵ and L⁵ have the meanings given under formula V above.

An alkyl or an alkoxy radical, i.e. an alkyl where the terminal CH₂ group is replaced by —O—, in this application may be straight-chain or branched. It is preferably straight-chain, has 1, 2, 3, 4, 5, 6, 7 or 8 carbon atoms and accordingly is preferably methyl, ethyl, propyl, butyl, pentyl, hexyl, heptyl, octyl, ethoxy, propoxy, butoxy, pentoxy, hexoxy, heptoxy, or octoxy, furthermore nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. an alkyl group in which one non-terminal CH₂ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkenyl group, i.e. an alkyl group wherein one or more CH₂ groups are replaced by —CH═CH—, may be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C-atoms are generally preferred.

In an alkyl group, wherein one CH₂ group is replaced by —O— and one by —CO—, these radicals are preferably neighboured. Accordingly these radicals together form a carbonyloxy group —CO—O— or an oxycarbonyl group —O—CO—. Preferably such an alkyl group is straight-chain and has 2 to 6 C atoms.

It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl) ethyl, 3-(methoxycarbonyl)propyl, 3-(ethoxycarbonyl) propyl, 4-(methoxycarbonyl)-butyl.

An alkyl group wherein two or more CH₂ groups are replaced by —O— and/or —COO—, it can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

A alkyl or alkenyl group that is monosubstituted by CN or CF₃ is preferably straight-chain. The substitution by CN or CF₃ can be in any desired position.

An alkyl or alkenyl group that is at least monosubstituted by halogen, it is preferably straight-chain. Halogen is preferably F or Cl, in case of multiple substitution preferably F. The resulting groups include also perfluorinated groups. In case of monosubstitution the F or Cl substituent can be in any desired position, but is preferably in w-position. Examples for especially preferred straight-chain groups with a terminal F substituent are fluoromethyl, 2-fluoroethyl, 3-fluoropropyl, 4-fluorobutyl, 5-fluoropentyl, 6-fluorohexyl and 7-fluoroheptyl. Other positions of F are, however, not excluded.

Halogen means F, Cl, Br and I and is preferably F or Cl, most preferably F. Each of $R^1$ to $R^5$ and $R^0$ may be a polar or a non-polar group. In case of a polar group, it is preferably selected from CN, $SF_5$, halogen, $OCH_3$, SCN, $COR^5$, $COOR^5$ or a mono-oligo- or polyfluorinated alkyl or alkoxy group with 1 to 4 C atoms. $R^5$ is optionally fluorinated alkyl with 1 to 4, preferably 1 to 3 C atoms. Especially preferred polar groups are selected of F, Cl, CN, $OCH_3$, $COCH_3$, $COC_2H_5$, $COOCH_3$, $COOC_2H_5$, $CF_3$, $CHF_2$, $CH_2F$, $OCF_3$, $OCHF_2$, $OCH_2F$, $C_2F_5$ and $OC_2F_5$, in particular F, Cl, CN, $CF_3$, $OCHF_2$ and $OCF_3$. In case of a non-polar group, it is preferably alkyl with up to 15 C atoms or alkoxy with 2 to 15 C atoms.

Each of $R^1$ to $R^5$ and $R^0$ may be an achiral or a chiral group. In case of a chiral group it is preferably of formula I*:

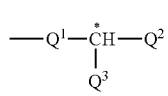

wherein
$Q^1$ is an alkylene or alkylene-oxy group with 1 to 9 C atoms or a single bond,
$Q^2$ is an alkyl or alkoxy group with 1 to 10 C atoms which may be unsubstituted, mono- or polysubstituted by F, Cl, Br or CN, it being also possible for one or more non-adjacent $CH_2$ groups to be replaced, in each case independently from one another, by —C≡C—, —O—, —S—, —NH—, —N($CH_3$)—, —CO—, —COO—, —OCO—, —OCO—O—, —S—CO— or —CO—S— in such a manner that oxygen atoms are not linked directly to one another,
$Q^3$ is F, Cl, Br, CN or an alkyl or alkoxy group as defined for $Q^2$ but being different from $Q^2$.

In case $Q^1$ in formula I* is an alkylene-oxy group, the O atom is preferably adjacent to the chiral C atom.

Preferred chiral groups of formula I* are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups I* are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched alkyl group may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

Preferably the liquid crystalline media according to the present invention comprise one or more reactive compounds, respectively polymerisable compounds, each comprising one, two or more reactive groups, respectively polymerizable groups. The mesogenic material preferably is stabilized in the blue phase by the formation of a polymer, which may have the form of a matrix or of a network.

For use in a display application, the temperature range of typical materials, which are exhibiting a pure blue phase (BP) on their own, generally is not wide enough. Such materially typically have a blue phase, which extends over a small temperature range of only some degrees, e.g. about 3 to 40°. Thus, an additional stabilisation, extending the temperature range of the blue phase, is needed in order to make such material suitable for practical applications such as in displays.

In order to stabilise the blue phase by the formation of a polymer, the liquid crystal medium comprising the compound of formula I is conveniently combined with an appropriate chiral dopant (one or more suitable chiral compounds), and optionally with one or more additional RMs. The resultant mixture is filled into the LC cell respectively display panel. The LC cell/panel is then held at a certain temperature at which the mixture is in the blue phase, e.g. it is heated or cooled until blue phase can be observed at a certain temperature. This temperature is maintained during the whole polymerisation process. The polymerisation of the polymerisable compounds of formula I and the optional additional RMs is typically controlled by UV irradiation of a typical medium-pressure mercury-vapour lamp. A standard condition is e.g. use of 3 $mW/cm^2$ for 180 sec. at a wavelength of 380 nm. To avoid damage to the LC material appropriate optical filters can be used additionally.

In the following the criteria for stability of the obtained polymer stabilised blue phase (BP) are briefly be explained.

Ensuring an excellent quality of the polymer stabilisation is critical for use of PS-BP in a display application. The quality of polymer stabilization is the judged by several criteria. Optical inspection ensures a good polymerisation. Any defect and/or haziness observed in the test cell/panel is an indication of an suboptimal polymer stabilisation. Electro-optical inspection under various load/stress conditions ensures long-time stability of the PS-BP. A typical display parameter is the so-called memory effect (ME). The memory effect is defined as the ratio of the contrast ratio for switching on and of the contrast ratio for switching off as a normalized measure of the residual transmission after one or more switching cycles have been executed. A value for this memory effect of 1.0 is an indicator of an excellent polymer stabilisation. A value for this memory effect of more than 1.1 indicates insufficient stabilisation of the blue phase.

The present invention further relates to an LC medium comprising one or more compounds of the formula I and one or more compounds selected from the group of the compounds of the formulae I-A, I-E, I-T, I-N, II, III, IV and V, and a chiral dopant, and to a polymer stabilized system obtainable by polymerisation of one or more compounds of the formula I alone or in combination with one or more further polymerisable compounds from a respective mixture, and to the use of such a stabilized system in electro-optical displays having a blue phase.

For the production of polymer stabilised displays according to the present invention, the polymerisable compounds are polymerised or crosslinked, in case one compound contains or more compounds contain two or more polymerisable groups, by in-situ polymerisation in the LC medium between the substrates of the LC display with application of a voltage. The polymerisation can be carried out in one step. It is preferable to carry out the polymerisation at a temperature at which the material, i.e. the mesogenic mixture comprising the chiral compounds and the polymer precursor are in the blue phase.

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure 651®, Irgacure 184®, Irgacure 907®, Irgacure 369® or Darocure 1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such as, for example, lower material costs and in particular less contamination of the LC medium by possible residual amounts of the initiator or degradation products thereof. The polymerisation can thus also be carried out without the addition of an initiator. In a preferred embodiment, the LC medium thus comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component, is preferably in the range from 10 to 10,000 ppm, particularly preferably in the range from 50 to 2,000 ppm, most preferably 0.2% or about 0.2%.

The polymerisable compounds of formula P used preferably according to the present invention can be polymerised individually, but it is also possible to polymerise mixtures which comprise two or more polymerisable compounds according to the invention, or mixtures comprising one or more polymerisable compounds according to the invention and one or more further polymerisable compounds (comonomers), which are preferably mesogenic or liquid-crystalline. In the case of polymerisation of such mixtures, copolymers form. A mixture of two or more compounds according to the invention or a mixture comprising one or more compounds according to the invention with one or more further polymerisable compounds is preferably used. The invention furthermore relates to the polymerisable mixtures mentioned above and below. The polymerisable compounds and comonomers are mesogenic or non-mesogenic, preferably mesogenic or liquid-crystalline.

Suitable and preferred co-monomers for use in polymer precursors for polymer stabilised displays according to the invention are selected, for example, from the following formulae:

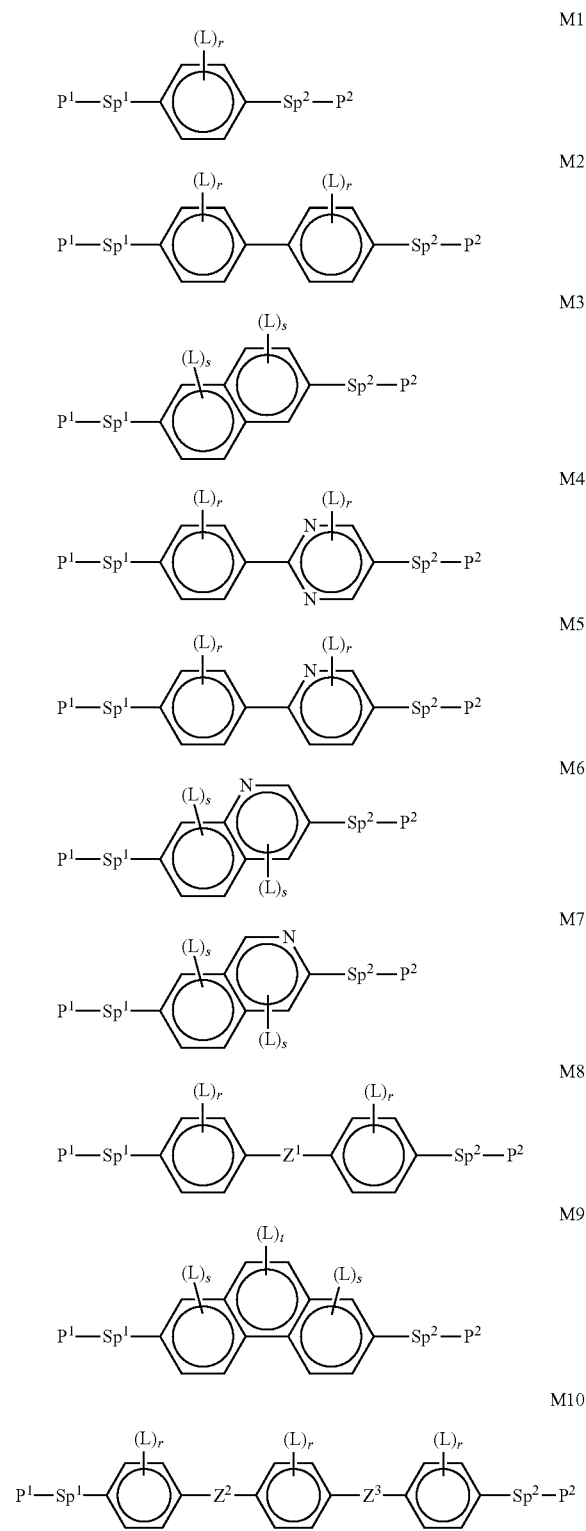

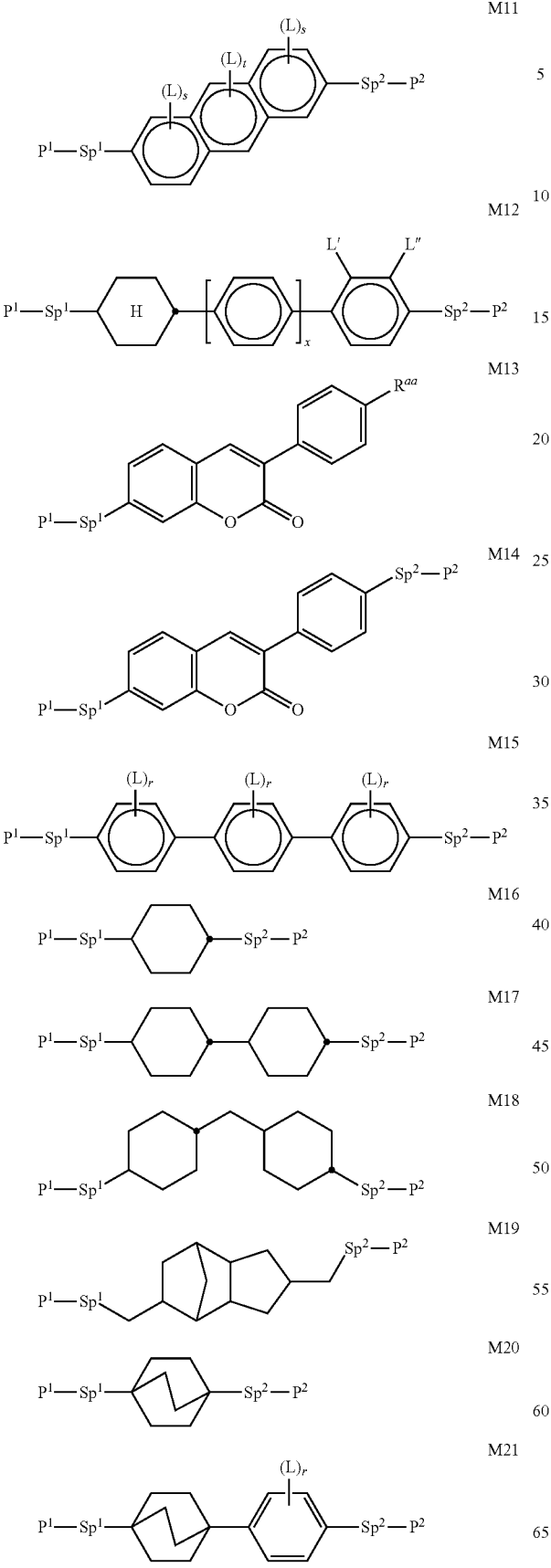
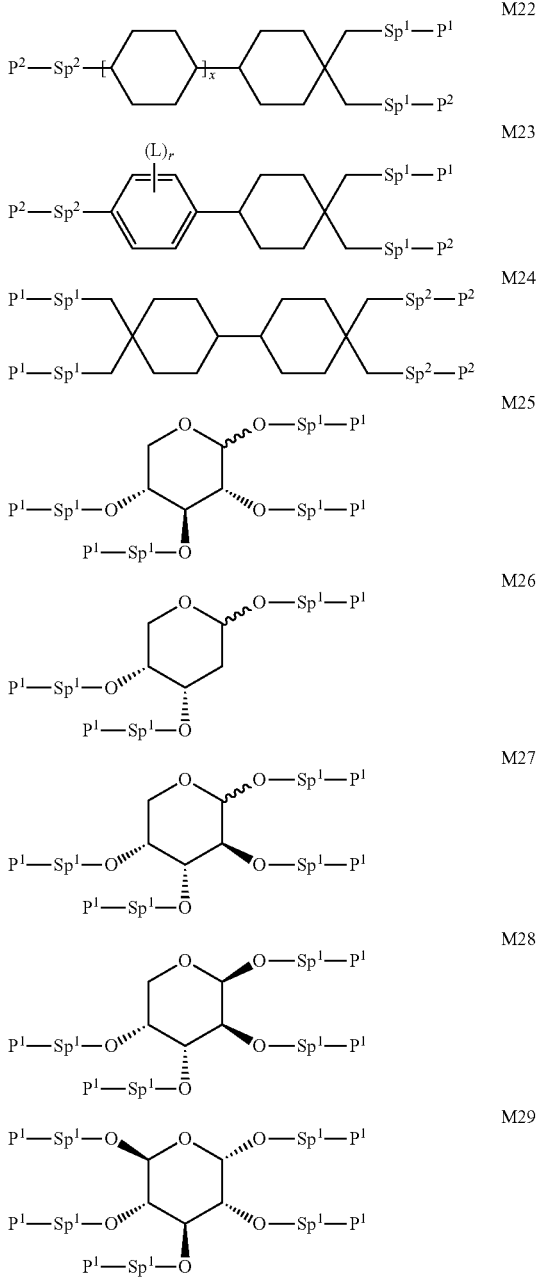

wherein the parameters have the following meanings:
$P^1$ and $P^2$ each, independently of one another, a polymerisable group, preferably having one of the meanings given above or below for $P^a$, particularly preferred an acrylate, methacrylate, fluoroacrylate, oxetane, vinyloxy- or epoxy group, $Sp^1$ and $Sp^2$ each, independently of one another, a single bond or a spacer group, preferably having one of the meanings given above or below for $Sp^a$, particularly preferred an $-(CH_2)_{p1}-$, $-(CH_2)_{p1}-O-$, $-(CH_2)_{p1}-CO-O-$ or $-(CH_2)_{p1}-O-CO-O-$, wherein p1 is an integer from 1 to 12, and wherein the groups mentioned last are linked to the adjacent ring via the O-atom, and, wherein alternatively also one or more of $P^1$-$Sp^1$- and $P^2$-$Sp^2$- may be $R^{aa}$, provided that at least one of $P^1$-$Sp^1$- and $P^2$-$Sp^2$- present in the compound is not $R^{aa}$, $R^{aa}$ H, F, Cl, CN or linear or branched alkyl having 1 to 25 C-atoms, wherein one or more non-adjacent —CH$_2$— groups, independently of each another, may be replaced by —C(R$^0$)=C(R$^{00}$)—, —C≡C—, —N(R$^0$)—, —O—, —S—, —CO—, —CO—O—, —O—CO—, —O—CO—O— in such a way that neither O- nor S-atoms are directly linked to one another, and wherein also one or more H-atoms may be replaced by F, Cl, CN or P$^1$-Sp$^1$-, particularly preferred linear or branched, optionally single- or polyfluorinated, alkyl, alkoxy, alkenyl, alkinyl, alkylcarbonyl, alkoxycarbonyl, or alkylcarbonyloxy having 1 to 12 C-atoms, wherein the alkenyl- and alkinyl groups have at least two and the branched groups have at least three C-atoms, R$^0$, R$^{00}$ each, at each occurrence independently of one another, H or alkyl having 1 to 12 C-atoms, R$^y$ and R$^z$ each, independently of one another, H, F, CH$_3$ or CF$_3$, Z$^1$ —O—, —CO—, —C(R$^y$R$^z$)—, or —CF$_2$CF$_2$—, Z$^2$ und Z$^3$ each, independently of one another, —CO—O—, —O—CO—, —CH$_2$O—, —OCH$_2$—, —CF$_2$O—, —OCF$_2$—, or —(CH$_2$)$_n$—, wherein n is 2, 3 or 4, L at each occurrence independently of one another, F, Cl, CN, SCN, SF$_5$ or linear or branched, optionally mono- or poly-fluorinated, alkyl, alkoxy, alkenyl, alkinyl, alkylcarbonyl, alkoxycarbonyl, alkylcarbonyloxy or alkoxycarbonyloxy having 1 to 12 C-atoms, preferably F, L' and L" each, independently of one another, H, F or Cl, r 0, 1, 2, 3 or 4, s 0, 1, 2 or 3, t 0, 1 or 2, and x 0 or 1.

Suitable and preferred co-monomers for use in displays according to the present application operable and/or operating at a temperature where the liquid crystal medium is in the blue are for example selected from the group of mono-reactive compounds, which are present in the precursor of the polymer stabilised systems in a concentration in the range from 1 to 9 wt.-%, particularly preferred from 4 to 7 wt.-%. Preferred mono-reactive compounds are the compounds of formulae M1 bis M29, wherein one or more of P$^1$-Sp$^1$- and P$^2$-Sp$^2$- are Rest R$^{aa}$, such that the compounds have a single reactive group only.

Particularly preferred mono-reactive compounds are the compounds of the following formulae

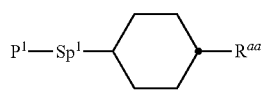

M16-A

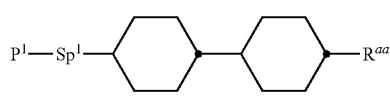

M17-A wherein P$^1$, Sp$^1$ and R$^{aa}$ have the respective meanings given above.

Amongst these the compounds of the formula

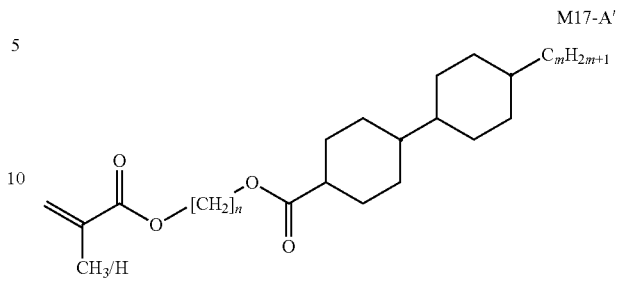

M17-A' wherein
n is an integer, preferably an even integer, in the range from 1 to 16, preferably from 2 to 8,
m is an integer in the range from 1 to 15, preferably from 2 to 7, are especially preferred.

Particular preference is given to an LC medium, an LC display, a process or the use as described above and below in which the LC medium or the polymerisable or polymerised component present therein comprises one or more compounds of the following formula:

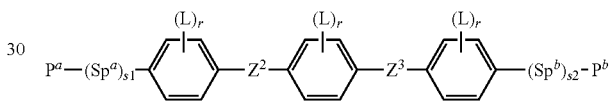

M10-A in which P$^a$, P$^b$, Sp$^a$, Sp$^b$, s1, s2 and L have the meanings indicated above and below, r denotes 0, 1, 2, 3 or 4, and Z$^2$ and Z$^3$ each, independently of one another, denote —CF$_2$—O— or —O—CF$_2$—, preferably Z$^2$ is —CF$_2$—O— and Z$^3$ is —O—CF$_2$— or vice versa, and, most preferably, Z$^2$ is —CF$_2$—O— and Z$^3$ is —O—CF$_2$—.

The compounds of formula I are accessible by the usual methods known to the expert. Starting materials may be, e.g., compounds of the following types, which are either commercially available or accessible by published methods:

Preferably the liquid crystalline media according to the instant invention contain a component A comprising, preferably predominantly consisting of and most preferably entirely consisting of compounds of formula I.

"Comprising" in this application means in the context of compositions that the entity referred to, e.g. the medium or the component, contains the compound or compounds in question, preferably in a total concentration of 10% or more and most preferably of 20% or more.

"Predominantly consisting of", in this context, means that the entity referred to contains 80% or more, preferably 90% or more and most preferably 95% or more of the compound or compounds in question.

"Entirely consisting of", in this context, means that the entity referred to contains 98% or more, preferably 99% or more and most preferably 100.0% of the compound or compounds in question.

The concentration of the compounds of formula I contained in the liquid crystal media according to the present application preferably is in the range from 0.1 to 10%, more preferably in the range from 1% to 8%.

In a preferred embodiment the liquid crystal modulation media according to the instant invention comprise
one or more compounds of formula I, preferably in a total concentration of 1% to 8% by weight, one compound or more compounds of formula I-A, preferably in a total concentration of 5% to 30% by weight, more preferably in a concentration of 10% to 25% by weight, one compound or more compounds of formula I-T, preferably in a total concentration of 30% to 70% by weight, more preferably in a concentration of 45% to 65% by weight, and one compound or more compounds of formula I-N, preferably in a total concentration of 5% to 45% by weight, more preferably in a concentration of 15% to 40% by weight, and one compound or more compounds of formula I-E, preferably in a total concentration of 3% to 30% by weight, more preferably in a concentration of 5% to 25% by weight, optionally, preferably obligatorily, one or more compounds selected from the group of compounds of formulae IV and V, if present, preferably in a concentration of 1% to 15% by weight, and/or of one or more chiral compounds with a HTP of ≥20 $\mu m^{-1}$, preferably in a concentration of 1% to 20% by weight, and/or In this application, unless explicitly stated otherwise the concentrations of the constituents of the host mixtures are given with respect to the total host mixture, i.e. excluding the chiral dopant(s) and the polymer precursor, the concentrations of the chiral dopant(s) are given with respect to the total host including mixture the chiral dopant(s) but excluding the polymer precursor, the concentrations of polymer precursor and its constituents are given with respect to the total mixture total, i.e. the mixture consisting of the host mixture, the chiral dopant(s) and the polymer precursor, The inventive mixtures preferably comprise one or more compounds selected from the group of compounds of formulae I-T and I-N and optionally I-A and/or I-E, preferably in a total concentration in the range from 5% or more to 70% or less, preferably from 10% or more to 50% or less and most preferably from 20% or more to 40% or less.

In particular, the inventive mixtures preferably comprise one or more compounds of formula I-T in a total concentration in the range from 5% or more to 60% or less, preferably from 10% or more to 50% or less and most preferably from 12% or more to 40% or less.

In particular, the inventive mixtures preferably comprise one or more compounds of formula I-N in a total concentration in the range from 5% or more to 40% or less, preferably from 10% or more to 30% or less and most preferably from 11% or more to 25% or less.

In case the inventive mixtures comprise one or more compounds of formula I-A, total concentration of these compounds preferably is in the range from 3% or more to 30% or less, preferably from 4% or more to 15% or less and most preferably from 5% or more to 11% or less.

In case the inventive mixtures comprise one or more compounds of formula I-E-1, the total concentration of these compounds preferably is in the range from 1% or more to 35% or less, preferably from 3% or more to 30% or less and most preferably from 4% or more to 25% or less.

In case the inventive mixtures comprise one or more compounds of formula I-E-2, the total concentration of these compounds preferably is in the range from 1% or more to 35% or less, preferably from 3% or more to 30% or less and most preferably from 4% or more to 25% or less.

In case the inventive mixtures comprise one or more compounds of formula V the total concentration of these compounds preferably is in the range from 1% or more to 15% or less, preferably from 2% or more to 10% or less and most preferably from 5% or more to 8% or less.

Suitable chiral compounds are those, which have an absolute value of the helical twisting power of 20 $\mu m^{-1}$ or more, preferably of 40 $\mu m^{-1}$ or more and most preferably of 60 $\mu m^1$ or more. The HTP is measured in the liquid crystalline medium MLC-6260 at a temperature of 20° C.

The liquid crystal media according to the present invention comprise preferably one or more chiral compounds which have a mesogenic structure und exhibit preferably one or more meso-phases themselves, particularly at least one cholesteric phase. Preferred chiral compounds being comprised in the liquid crystal media are, amongst others, well known chiral dopants like cholesteryl-nonanoate (also short CN), R/S-811, R/S-1011, R/S-2011, R/S-3011, R/S-4011, R/S-5011, CB-15 (all Merck KGaA, Darmstadt, Germany). Preferred are chiral dopants having one or more chiral moieties and one or more mesogenic groups or having one or more aromatic or alicyclic moieties forming, together with the chiral moiety, a mesogenic group. More preferred are chiral moieties and mesogenic chiral compounds disclosed in DE 34 25 503, DE 35 34 777, DE 35 34 778, DE 35 34 779, DE 35 34 780, DE 43 42 280, EP 01 038 941 and DE 195 41 820 that disclosure is incorporated within this application by way of reference. Particular preference is given to chiral binaphthyl derivatives as disclosed in EP 01 111 954.2, chiral binaphthol derivatives as disclosed in WO 02/34739, chiral TADDOL derivatives as disclosed in WO 02/06265 as well as chiral dopants having at least one fluorinated linker and one end chiral moiety or one central chiral moiety as disclosed in WO 02/06196 and WO 02/06195.

Preferred embodiments are indicated below:

the medium comprises one, two or three compounds of formula I, preferably of formula I1 and/or I2, the medium comprises one, two, three, four or more compounds of formula I-E, preferably of formula I-E-1, and/or the medium comprises one, two or more compounds of formula II, preferably of formula II-3, and/or the medium comprises one or more compounds of formula III and/or the medium comprises one, two or more compounds of formula IV, preferably of formula IV-2, and/or the medium comprises one, two, three or more compounds of formula V, and/or the medium comprises one, two, three or more chiral compounds, preferably having a helical twisting power of 20 $\mu m^{-1}$ or more.

It has been found that even a relatively small proportion of compounds of the formulae I mixed with conventional liquid-crystal materials, but in particular with one or more compounds of the formulae I-A and/or I-E and/or I-N and/or I-T and/or II and/or III, leads to a lower operating voltage and a broader operating temperature range.

The compounds of the formulae I, I-A, I-E, I-N, I-T, and II to V are colourless, stable and readily miscible with one another and with other liquid-crystalline materials.

The optimum mixing ratio of the compounds of the formulae I and optionally I-A, I-E, I-N and I-T, and II to V depends substantially on the desired properties, on the choice of the components of the formulae I and/or I-A and/or I-E and/or I-N and/or I-T, and/or II to V, and on the choice of any other components that may be present. Suitable mixing ratios within the range given above can easily be determined from case to case.

The total amount of compounds of the respective individual formulae I, I-A, I-E, I-N and I-T a in the mixtures according to the invention is in many cases not crucial, as long as the total amount of compounds is 85% or more.

The mixtures can therefore comprise one or more further components for the purposes of optimisation of various properties. However, the observed effect on the operating voltage and the operating temperature range is generally greater, the higher the total concentration of compounds of the formulae I and optionally I-A and/or I-E and/or I-N and/or I-T.

The individual compounds of the formulae I, I-A, I-E, I-N, I-T, and II to V, which can be preferably used in the media according to the invention, are either known or can be prepared analogously to the known compounds.

The construction of the MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM, however, particularly preferred are displays, which have electrodes on just one of the substrates, i.e. so called inter-digital electrodes, as those used in IPS displays, preferably in one of the established structures.

A significant difference between the displays according to the invention and the conventional displays based on the twisted nematic cell consists, however, in the choice of the liquid-crystal parameters of the liquid-crystal layer.

The media according to the invention are prepared in a manner conventional per se. In general, the components are dissolved in one another, advantageously at elevated temperature. By means of suitable additives, the liquid-crystalline phases in accordance with the invention can be modified in such a way that they can be used in all types of liquid crystal display elements that have been disclosed hitherto. Additives of this type are known to the person skilled in the art and are described in detail in the literature (H. Kelker and R. Hatz, Handbook of Liquid Crystals, Verlag Chemie, Weinheim, 1980). For example, pleochroic dyes can be added for the preparation of coloured guest-host systems or substances can be added in order to modify the dielectric anisotropy, the viscosity and/or the alignment of the nematic phases. Furthermore, stabilisers and antioxidants can be added.

The mixtures according to the invention are suitable for TN, STN, ECB and IPS applications and isotropic switching mode (ISM) applications. Hence, there use in an electro-optical device and an electro-optical device containing liquid crystal media comprising at least one compound according to the invention are subject matters of the present invention.

The inventive mixtures are highly suitable for devices, which operate in an optically isotropic state. The mixtures of the invention are surprisingly found to be highly suitable for the respective use.

Electro-optical devices that are operated or operable in an optically isotropic state recently have become of interest with respect to video, TV, and multi-media applications. This is, because conventional liquid crystal displays utilizing electro-optical effects based on the physical properties of liquid crystals exhibit a rather high switching time, which is undesired for said applications. Furthermore most of the conventional displays show a significant viewing angle dependence of contrast that in turn makes necessary measures to compensate this undesired property.

With regard to devices utilizing electro-optical effects in an isotropic state the German Patent Application DE 102 17 273 A1 for example discloses light-controlling (light modulation) elements in which the liquid crystal controlling medium for modulation is in the isotropic phase at the operating temperature. These light controlling elements have a very short switching time and a good viewing angle dependence of contrast. However, the driving or operating voltages of said elements are very often unsuitably high for some applications.

German Patent Application DE 102 41 301 A1 describes specific structures of electrodes allowing a significant reduction of the driving voltages. However, these electrodes make the process of manufacturing the light controlling elements more complicated.

Furthermore, the light controlling elements, for example, disclosed in both DE 102 17 273 A1 and DE 102 41 301 show significant temperature dependence. The electro-optical effect that can be induced by the electrical field in the controlling medium being in an optical isotropic state is most pronounced at temperatures close to the clearing point of the controlling medium. In this range the light controlling elements have the lowest values of their characteristic voltages and, thus, require the lowest operating voltages. As temperature increases, the characteristic voltages and hence the operating voltages increase remarkably. Typical values of the temperature dependence are in the range from about a few volts per centigrade up to about ten or more volts per centigrade. While DE 102 41 301 describes various structures of electrodes for devices operable or operated in the isotropic state, DE 102 17 273 A1 discloses isotropic media of varying composition that are useful in light controlling elements operable or operated in the isotropic state. The relative temperature dependence of the threshold voltage in these light controlling elements is at a temperature of 1 centigrade above the clearing point in the range of about 50%/centigrade. That temperature dependence decreases with increasing temperature so that it is at a temperature of 5 centigrade above the clearing point of about 10%/centigrade. However, for many practical applications of displays utilizing said light controlling elements the temperature dependence of the electro-optical effect is too high. To the contrary, for practical uses it is desired that the operating voltages are independent from the operating temperature over a temperature range of at least some centi-grades, preferably of about 5 centi-grades or more, even more preferably of about 10 centi-grades or more and especially of about 20 centi-grades or more.

Now it has been found that the use of the inventive mixtures are highly suitable as controlling media in the light controlling elements as described above and in DE 102 17 273 A1, DE 102 41 301 A1 and DE 102 536 06 A1 and broaden the temperature range in which the operating voltages of said electro-optical operates. In this case the optical isotropic state or the blue phase is almost completely or completely independent from the operating temperature.

This effect is even more distinct if the liquid crystal controlling media exhibit at least one so-called "blue phase" as described in WO 2004/046 805 A1. Liquid crystals having an extremely high chiral twist may have one or more optically isotropic phases. If they have a respective cholesteric pitch, these phases might appear bluish in a cell having a sufficiently large cell gap. Those phases are therefore also called "blue phases" (Gray and Goodby, "Smectic Liquid Crystals, Textures and Structures", Leonhard Hill, USA, Canada (1984)). Effects of electrical fields on liquid crystals existing in a blue phase are described for instance in H. S. Kitzerow, "The Effect of Electric Fields on Blue Phases", Mol. Cryst. Liq. Cryst. (1991), Vol. 202, p. 51-83, as well as the three types of blue phases identified so far, namely BP I, BP II, and BP III, that may be observed in field-free liquid crystals. It is noteworthy, that if the liquid crystal exhibiting a blue phase or blue phases is subjected to an electrical field, further blue phases or other phases different from the blue phases I, II and III might appear.

The inventive mixtures can be used in an electro-optical light-controlling element which comprises
one or more, especially two substrates;
an assembly of electrodes;
one or more elements for polarizing the light; and
said controlling medium;
whereby said light-controlling element is operated (or operable) at a temperature at which the controlling medium is in an optically isotropic phase when it is in a non-driven state.

The controlling medium of the present invention has a characteristic temperature, preferably a clearing point, in the range from about −30° C. to about 90° C., especially up to about 70° C. to 80° C.

The operating temperature of the light controlling elements is preferably above the characteristic temperature of the controlling medium said temperature being usually the transition temperature of the controlling medium to the blue phase; generally the operating temperature is in the range of about 0.1° to about 50°, preferably in the range of about 0.1° to about 10° above said characteristic temperature. It is highly preferred that the operating temperature is in the range from the transition temperature of the controlling medium to the blue phase up to the transition temperature of the controlling medium to the isotropic phase which is the clearing point. The light controlling elements, however, may also be operated at temperatures at which the controlling medium is in the isotropic phase.

For the purposes of the present invention the term "characteristic temperature" is defined as follows:
If the characteristic voltage as a function of temperature has a minimum, the temperature at this minimum is denoted as characteristic temperature.
If the characteristic voltage as a function of temperature has no minimum and if the controlling medium has one or more blue phases, the transition temperature to the blue phase is denoted as characteristic temperature; in case there are more than one blue phase, the lowest transition temperature to a blue phase is denoted as characteristic temperature.
If the characteristic voltage as a function of temperature has no minimum, and if the controlling medium has no blue phase, the transition temperature to the isotropic phase is denoted as characteristic temperature.

In the context of the present invention the term "alkyl" means, as long as it is not defined in a different manner elsewhere in this description or in the claims, straight-chain and branched hydrocarbon (aliphatic) radicals with 1 to 15 carbon atoms. The hydrocarbon radicals may be unsubstituted or substituted with one or more substituents being independently selected from the group consisting of F, Cl, Br, I or CN.

The dielectrics may also comprise further additives known to the person skilled in the art and described in the literature. For example, 0 to 5% of pleochroic dyes, antioxidants or stabilizers can be added.

C denotes a crystalline phase, S a smectic phase, $S_C$ a smectic C phase, N a nematic phase, I the isotropic phase and BP the blue phase.

$V_X$ denotes the voltage for X % transmission. Thus e.g. $V_{10}$ denotes the voltage for 10% transmission and $V_{100}$ denotes the voltage for 100% transmission (viewing angle perpendicular to the plate surface). $t_{on}$ (respectively $\tau_{on}$) denotes the switch-on time and $t_{off}$ (respectively $\tau_{off}$) the switch-off time at an operating voltage corresponding the value of $V_{100}$, respectively of $V_{max}$. $t_{on}$ is the time for the change of the relative transmission from 10% to 90% and $t_{off}$ is the time for the change of the relative transmission from 90% to 10%. The response times are determined with the measurement instrument DMS from Autronic Melchers, Germany, just as the electro-optical characteristics.

$\Delta n$ denotes the optical anisotropy. $\Delta\varepsilon$ denotes the dielectric anisotropy ($\Delta\varepsilon=\varepsilon_\parallel-\varepsilon_\perp$, where $\varepsilon_\parallel$ denotes the dielectric constant parallel to the longitudinal molecular axes and $\varepsilon_\perp$ denotes the dielectric constant perpendicular thereto). The electro-optical data are measured in a TN cell at the 1$^{st}$ minimum of transmission (i.e. at a (d·$\Delta n$) value of 0.5 μm) at 20° C., unless expressly stated otherwise. The optical data are measured at 20° C., unless expressly stated otherwise.

Optionally, the light modulation media according to the present invention can comprise further liquid crystal compounds in order to adjust the physical properties. Such compounds are known to the expert. Their concentration in the media according to the instant invention is preferably 0% to 30%, more preferably 0% to 20% and most preferably 5% to 15%.

Preferably inventive media have a range of the blue phase or, in case of the occurrence of more than one blue phase, a combined range of the blue phases, with a width of 20° or more, preferably of 40° or more, more preferably of 50° or more and most preferably of 60° or more.

In a preferred embodiment this phase range is at least from 10° C. to 30° C., most preferably at least from 10° C. to 40° C. and most preferably at least from 0° C. to 50° C., wherein at least means, that preferably the phase extends to temperatures below the lower limit and at the same time, that it extends to temperatures above the upper limit.

In another preferred embodiment this phase range is at least from 20° C. to 40° C., most preferably at least from 30° C. to 80° C. and most preferably at least from 30° C. to 90° C. This embodiment is particularly suited for displays with a strong backlight, dissipating energy and thus heating the display.

Preferably the inventive media have a dielectric anisotropy of 150 or more, more preferably of 200 or more, even more preferably of 300 or more and most preferably of 400 or more. In particular, the value of dielectric anisotropy of the inventive media is preferably 700 or less, more preferably 550 or less and, most preferably 500 or less.

In the present application the term dielectrically positive compounds describes compounds with $\Delta\varepsilon>1,5$, dielectrically neutral compounds are compounds with $-1,5\leq\Delta\varepsilon\leq1,5$ and dielectrically negative compounds are compounds with $\Delta\varepsilon<-1,5$. The same holds for components. $\Delta\varepsilon$ is determined at 1 kHz and 20° C. The dielectric anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta \varepsilon$) is determined at a frequency of 1 kHz. The threshold voltages, as well as all other electro-optical properties have been determined with test cells prepared at Merck KGaA, Germany. The test cells for the determination of $\Delta \varepsilon$ had a cell gap of 22 µm. The electrode was a circular ITO electrode with an area of 1.13 cm² and a guard ring. The orientation layers were lecithin for homeotropic orientation ($\varepsilon_\parallel$) and polyimide AL-1054 from Japan Synthetic Rubber for homogenous orientation ($\varepsilon_\perp$). The capacities were determined with a frequency response analyser Solatron 1260 using a sine wave with a voltage of 0.3 or 0.1 $V_{rms}$. The light used in the electro-optical measurements was white light. The set up used was a commercially available equipment of Otsuka, Japan. The characteristic voltages have been determined under perpendicular observation. The threshold voltage ($V_{10}$), mid-grey voltage ($V_{50}$) and saturation voltage ($V_{90}$) have been determined for 10%, 50% and 90% relative contrast, respectively.

The liquid crystal modulation material has been filled into an electro optical test cell prepared at the respective facility of Merck KGaA. The test cells had inter-digital electrodes on one substrate side. The electrode width was 10 µm, the distance between adjacent electrodes was 10 µm and the cell gap was also 10 µm. This test cell has been evaluated electro-optically between crossed polarisers.

At low temperatures, the filled cells showed the typical texture of a chiral nematic mixture, with an optical transmission between crossed polarisers without applied voltage. Upon heating, at a first temperature ($T_1$) the mixtures turned optically isotropic, being dark between the crossed polarisers. This indicated the transition from the chiral nematic phase to the blue phase at that temperature. Up to a second temperature ($T_2$) the cell showed an electro-optical effect under applied voltage, typically of some tens of volts, a certain voltage in that range leading to a maximum of the optical transmission. Typically at a higher temperature the voltage needed for a visible electro-optical effect increased strongly, indicating the transition from the blue phase to the isotropic phase at this second temperature ($T_2$).

The temperature range ($\Delta T(BP)$), where the mixture can be used electro-optically in the blue phase most beneficially has been identified as ranging from $T_1$ to $T_2$. This temperature range ($\Delta T(BP)$) is the temperature range given in the examples of this application. The electro-optical displays can also be operated at temperatures beyond this range, i.e. at temperatures above $T_2$, albeit only at significantly increased operation voltages.

The liquid crystal media according to the present invention can contain further additives and chiral dopants in usual concentrations. The total concentration of these further constituents is in the range of 0% to 10%, preferably 0.1% to 6%, based in the total mixture. The concentrations of the individual compounds used each are preferably in the range of 0.1 to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 5 to 20 and most preferably of 6 to 14 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-, VAN-AMD (vertically aligned nematic-active matrix display) and in particular in composite systems, like PDLC—(polymer dispersed liquid crystal), NCAP—(nematically curvilinerarily aligned polymer) and PN—(polymer network) LCDs and especially in HPDLCs (holographic PDLCs).

The melting point: T(K,N), T(K,S) or T(K,I), respectively, the transition temperature from one smectic phase ($S_x$) to another smectic phase ($S_Y$): T($S_X,S_Y$), the transition temperature from the smectic (S) to the nematic (N) phase: T(S,N), the clearing point: T (N,I), and the glass transition temperature: $T_g$ of the liquid crystals, as applicable, as well as any other temperature throughout this application, are given in degrees centi-grade (i.e. Celsius).

The compounds of the formula I and the sub-formulae thereof can be prepared analogously to the process known to the person skilled in the art and described in standard works of organic chemistry, such as, for example, in Houben-Weyl, Methoden der organischen Chemie [Methods of Organic Chemistry], Thieme-Verlag, Stuttgart.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C |  |
| P | 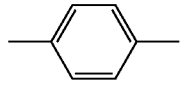 |
| D | 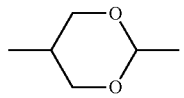 |
| DI | 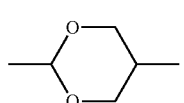 |
| A | 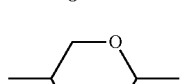 |
| AI | 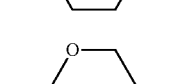 |
| G | 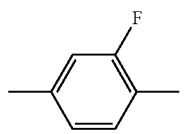 |
| GI | 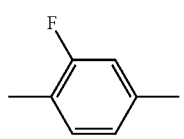 |
| U | 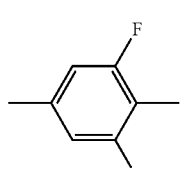 |

TABLE A-continued

| Ring elements | |
|---|---|
| UI | 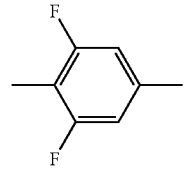 |
| Y | 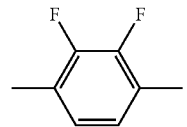 |
| M | 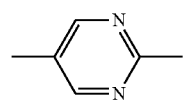 |
| MI | 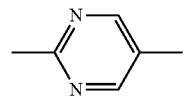 |
| N | 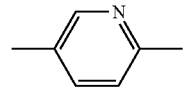 |
| NI | 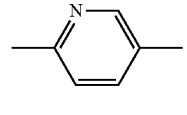 |
| Np | 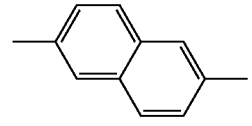 |
| dH | 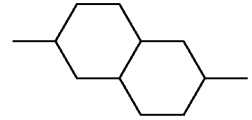 |
| N3f | 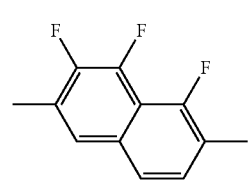 |
| N3fI | 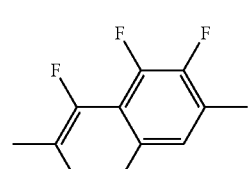 |
| tH | 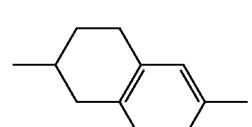 |

TABLE A-continued

| | Ring elements |
|---|---|
| tHI | (2,6-disubstituted tetrahydronaphthalene) |
| tH2f | (difluoro-tetrahydronaphthalene) |
| tH2fI | (difluoro-tetrahydronaphthalene isomer) |
| K | (trifluoro-indane) |
| KI | (trifluoro-indane isomer) |
| L | (cyclohexene, 1,4-disubstituted) |
| LI | (cyclohexadiene) |
| F | (fluoro-cyclohexene) |
| FI | (fluoro-cyclohexene isomer) |

TABLE B

| | Linking groups | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

| | End groups | | |
|---|---|---|---|
| | Left-hand side | | Right-hand side |
| | Use alone | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| | Use together with one another and/or with others | | |
| -...A...- | —C≡C— | -...A... | —C≡C— |
| -...V...- | CH=CH— | -...V... | —CH=CH— |
| -...Z...- | —CO—O— | -...Z... | —CO—O— |

TABLE C-continued

| End groups | | | |
|---|---|---|---|
| Left-hand side | | Right-hand side | |
| - ... ZI ... - | —O—CO— | - ... ZI ... | —O—CO— |
| - ... K ... - | —CO— | - ... K ... | —CO— |
| - ... W ... - | —CF=CF— | - ... W ... | —CF=CF— | in which n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures $C_nH_{2n+1}$—〔phenyl〕—CO—O—〔phenyl-F〕—CN

PZG-n-N $C_nH_{2n+1}$—〔cyclohexyl〕—〔phenyl〕—CO—O—〔phenyl-F〕—CN

CPZG-n-N $C_nH_{2n+1}$—〔phenyl-F〕—〔phenyl-F〕—〔phenyl〕—F

GGP-n-F $C_nH_{2n+1}$—〔phenyl-F〕—〔phenyl-F〕—〔phenyl〕—Cl

GGP-n-CL $C_nH_{2n+1}$—〔phenyl-F〕—〔phenyl-F〕—〔phenyl〕—F

PGIGI-n-F

TABLE D-continued
Illustrative structures
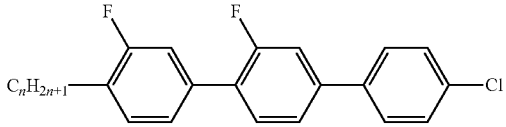
PGIGI-n-CL
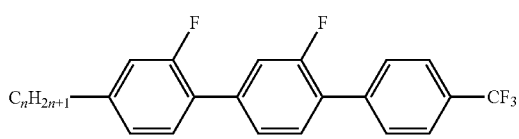
GGP-n-T
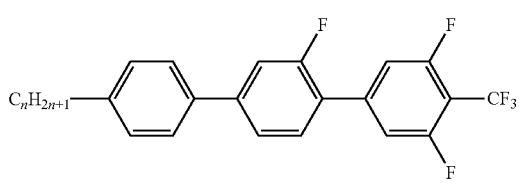
PGU-n-T
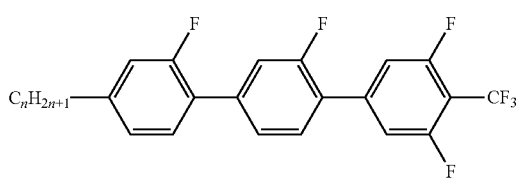
GGU-n-T
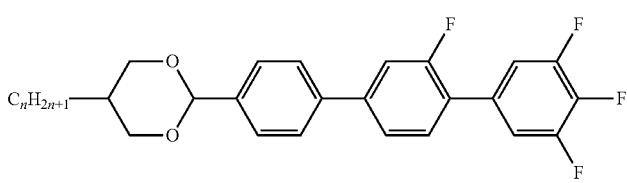
DPGU-n-F
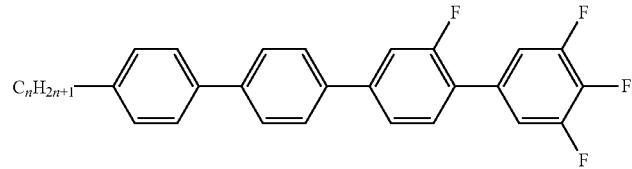
PPGU-n-F
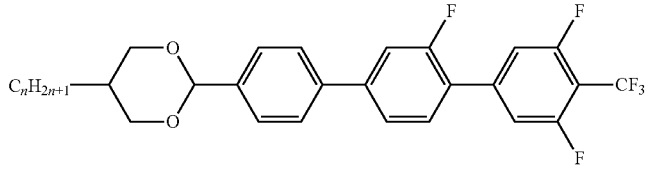
DPGU-n-T TABLE D-continued
Illustrative structures
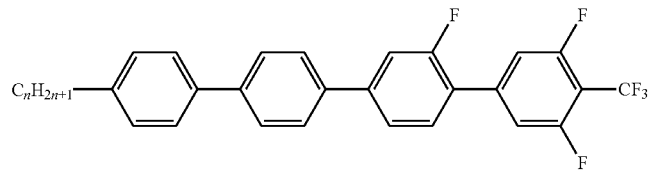
PPGU-n-T
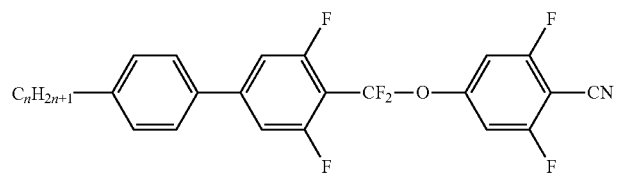
PUQU-n-N
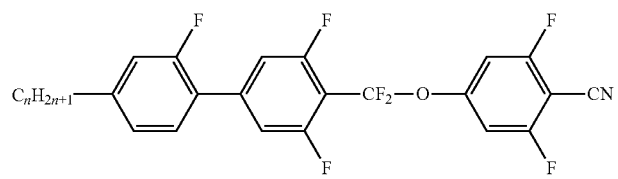
GUQU-n-N
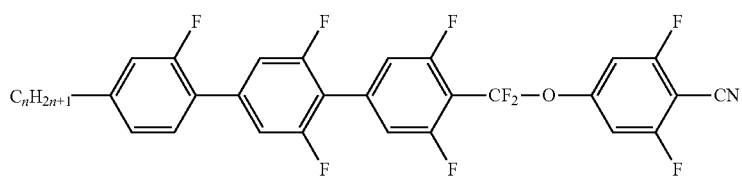
GUUQU-n-N
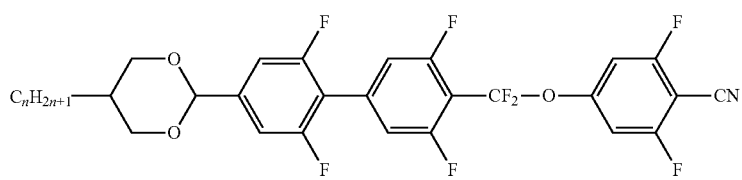
DUUQU-n-N
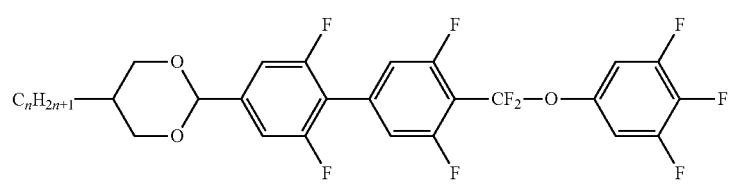
DUUQU-n-F TABLE D-continued
| Illustrative structures |
|---|
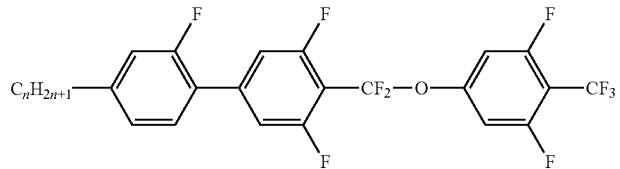
GUQU-n-F
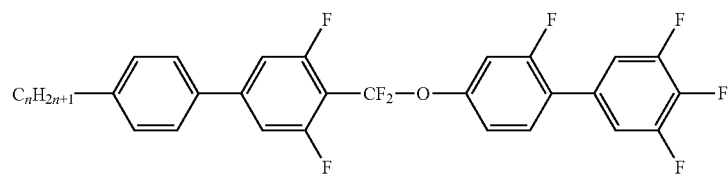
PUQGU-n-F
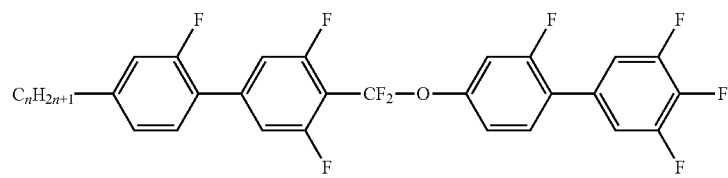
GUQGU-n-F
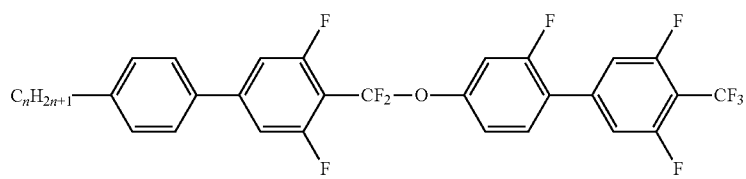
PUQGU-n-T
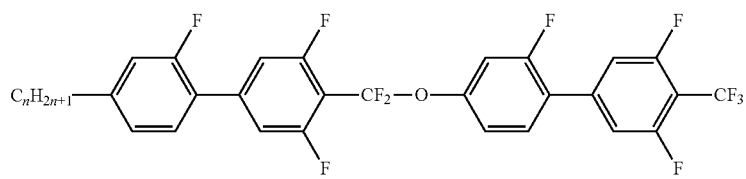
GUQGU-n-T
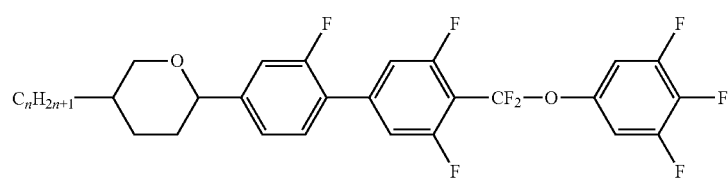
AGUQU-n-F TABLE D-continued
Illustrative structures
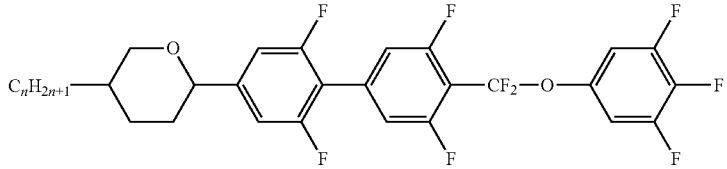
AUUQU-n-F
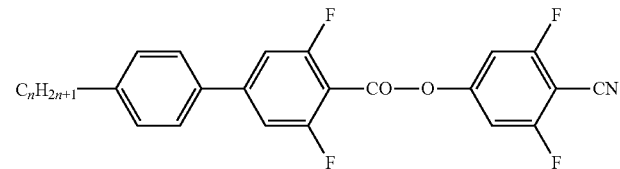
PUZU-n-N
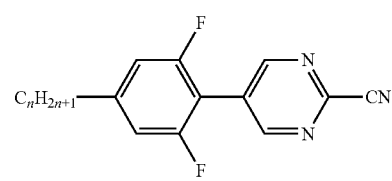
UM-n-N
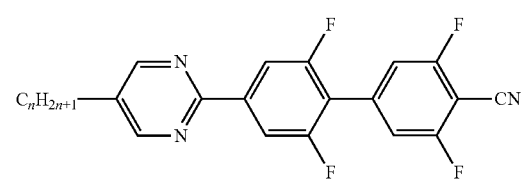
MUU-n-N
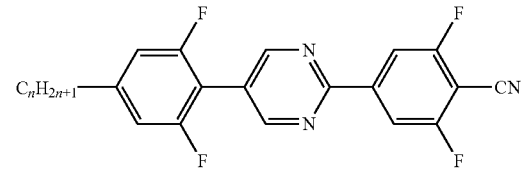
UMU-n-N
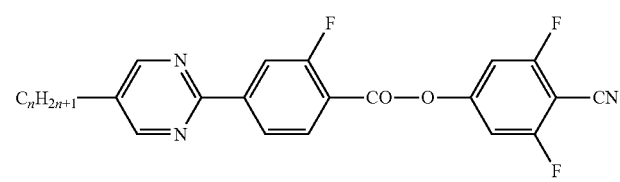
MGZU-n-N TABLE D-continued
Illustrative structures
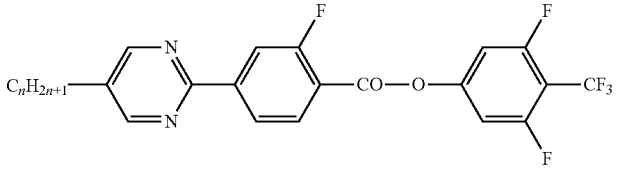
MGZU-n-T
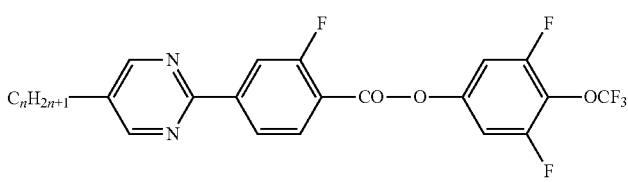
MGZU-n-OT
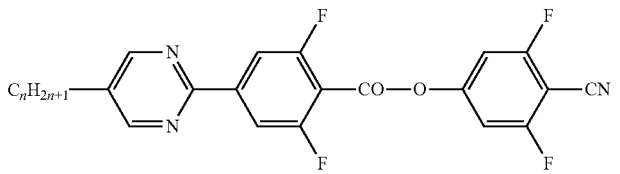
MUZU-n-N
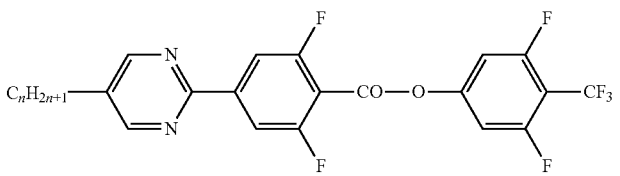
MUZU-n-T
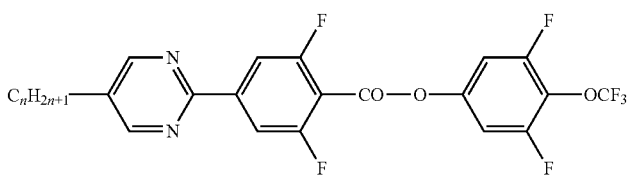
MUZU-n-OT in which n (and, if present, also m and l) preferably, independently of one another, denote(s) an integer from 1 to 7, preferably from 2 to 6.
The following table, Table E, shows illustrative compounds which can be used as stabiliser in the liquid crystal media according to the present invention.
TABLE E
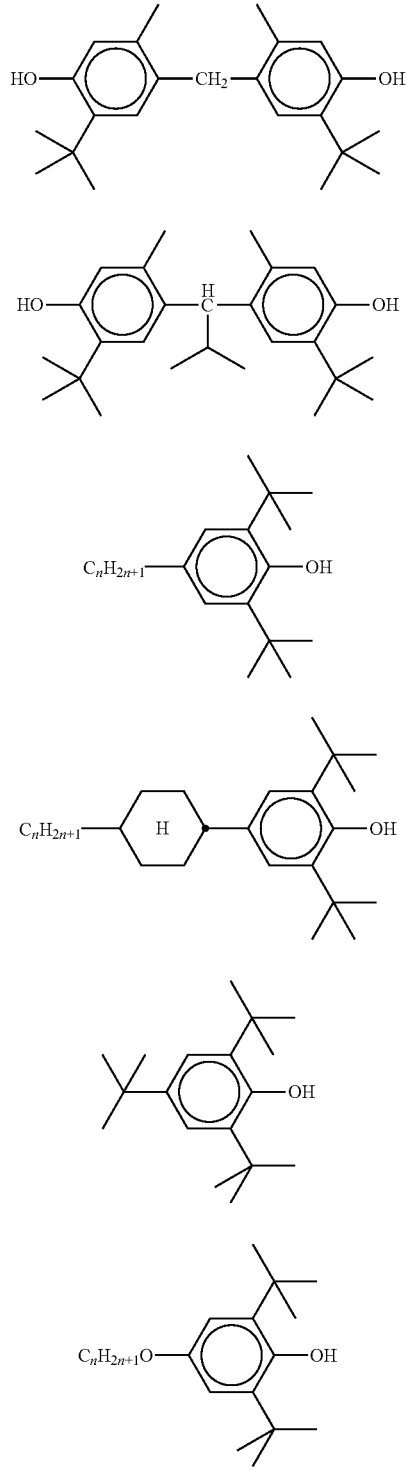
TABLE E-continued
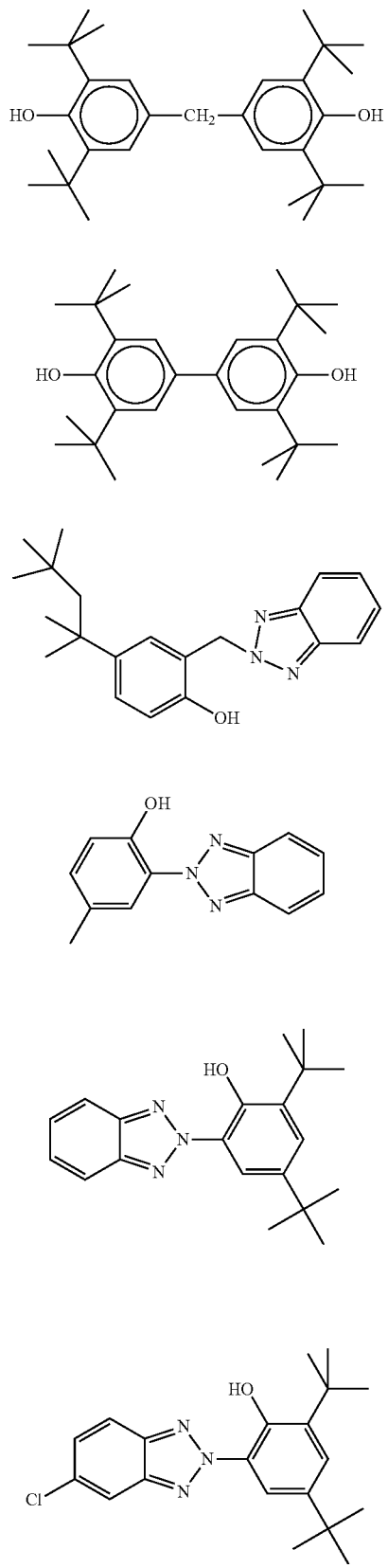

TABLE E-continued
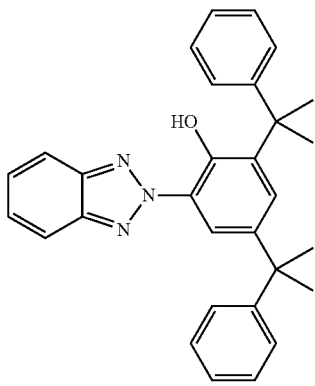 [SMILES: CC(C)(c1ccccc1)c1cc(-n2nc3ccccc3n2)c(O)c(C(C)(C)c2ccccc2)c1]
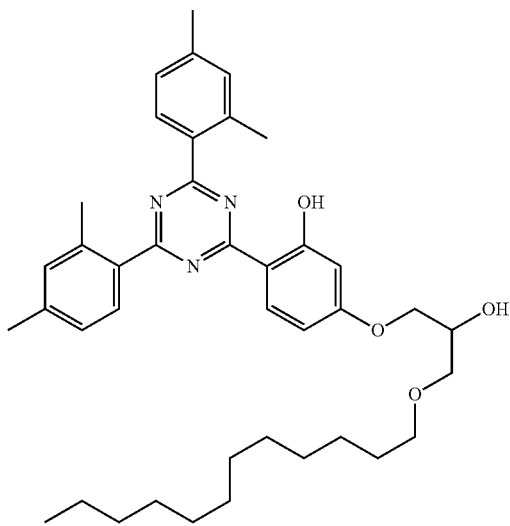
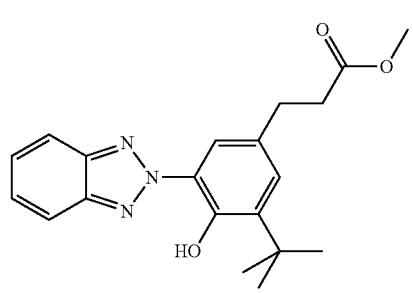 [SMILES: COC(=O)CCc1cc(-n2nc3ccccc3n2)c(O)c(C(C)(C)C)c1]
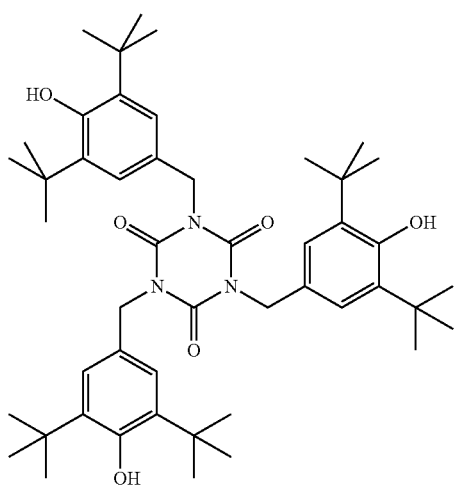
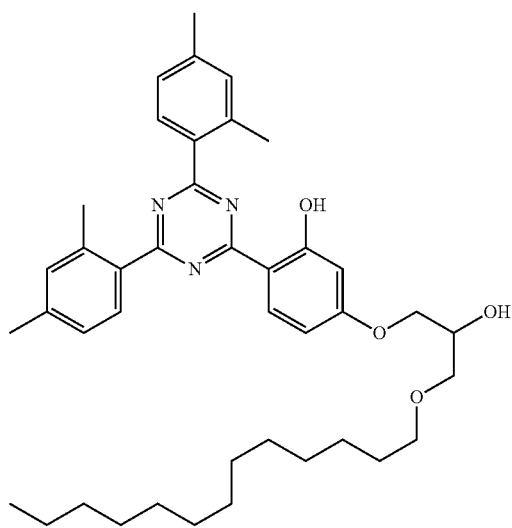 [SMILES: CCCCCCCCCCCCCOCC(O)COc1ccc(-c2nc(-c3ccc(C)cc3C)nc(-c3ccc(C)cc3C)n2)c(O)c1]
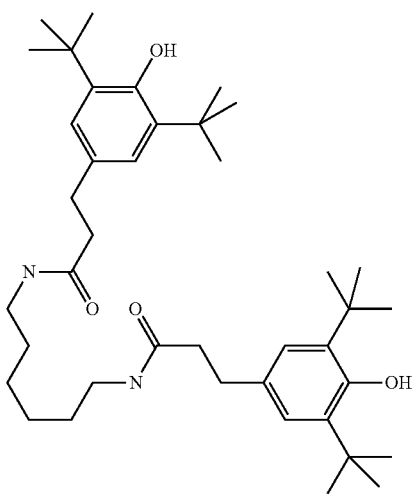 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE E-continued

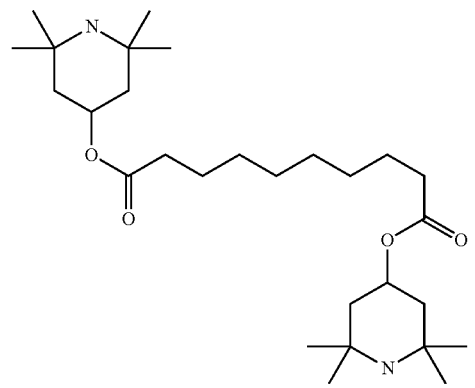

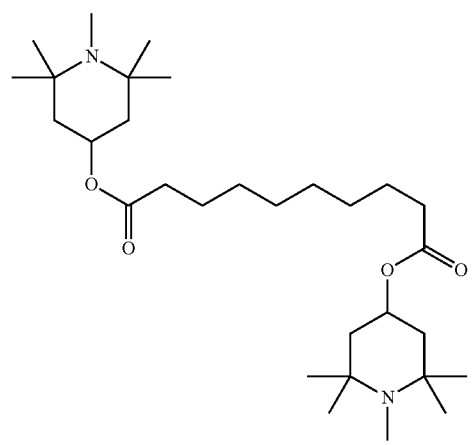

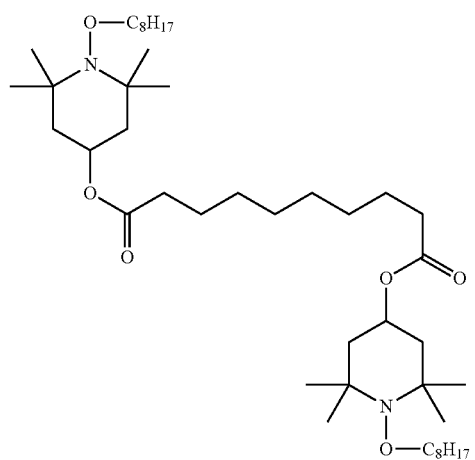

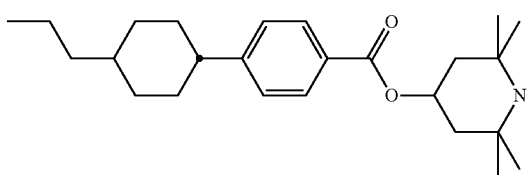

TABLE E-continued

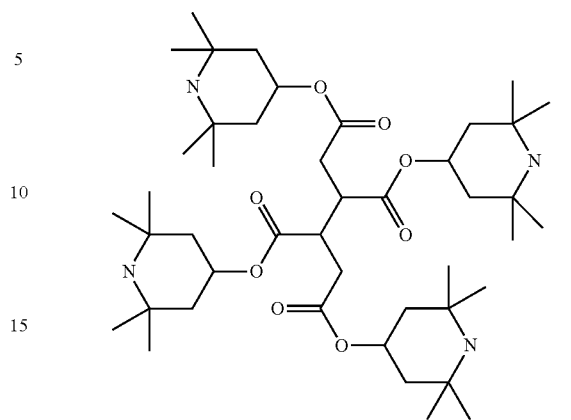

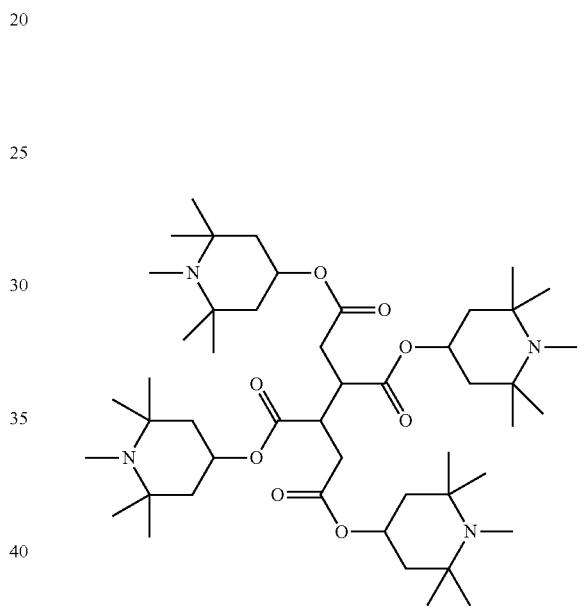

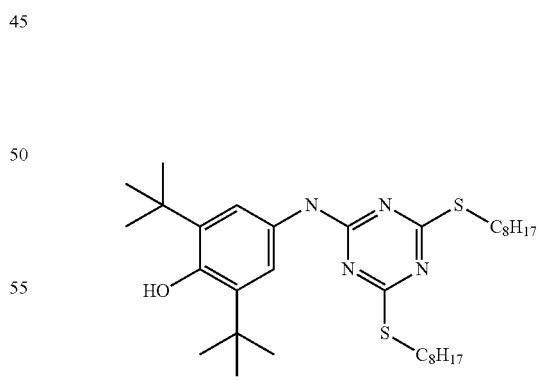

In a preferred embodiment of the present invention, the liquid crystal media comprise one or more compounds selected from the group of the compounds from Table E.

The following table, Table F, shows illustrative compounds which can preferably be used as chiral dopants in the liquid crystal media according to the present invention.

TABLE F
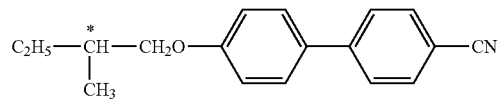
C 15
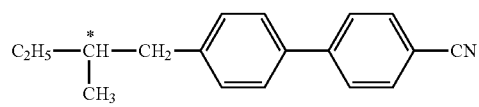
CB 15
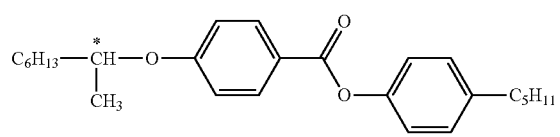
CM 21
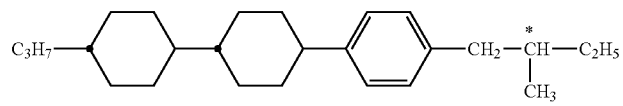
CM 44
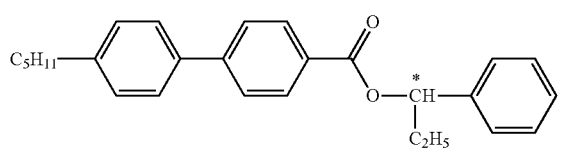
CM 45
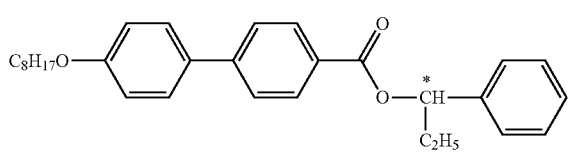
CM 47
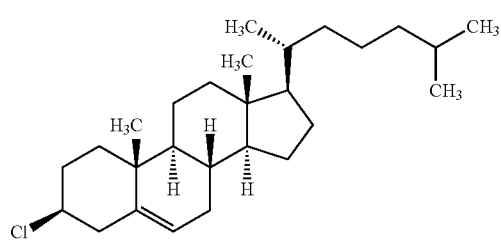
CC TABLE F-continued
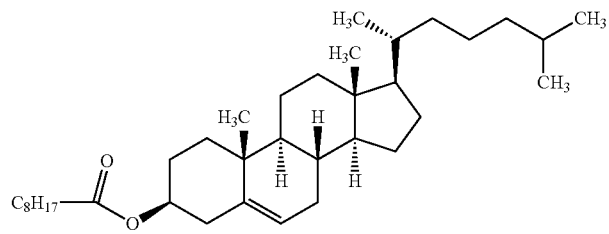
CN
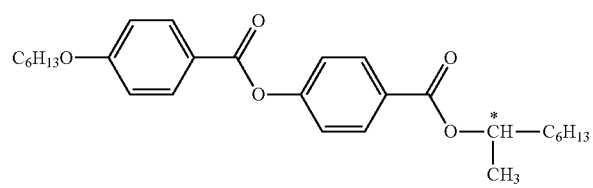
R/S-811
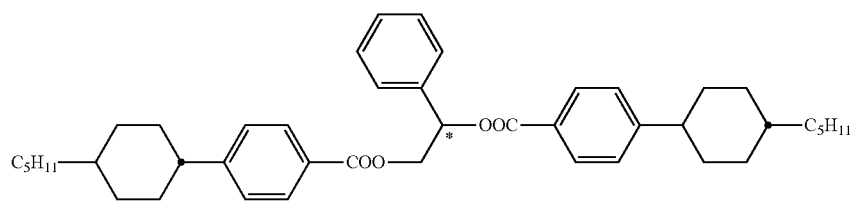
R/S-1011
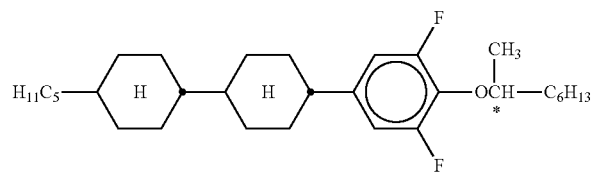
R/S-2011
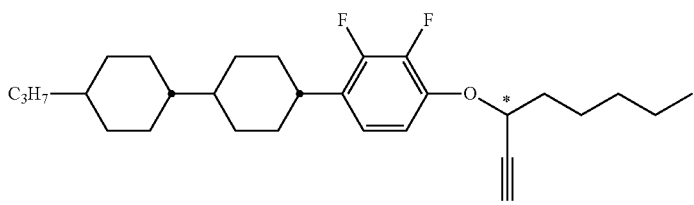
R/S-3011
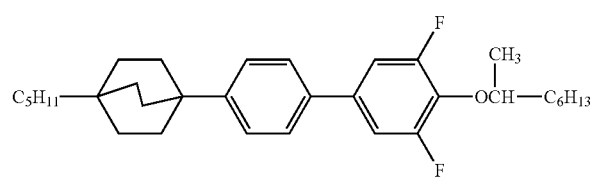
R/S-4011

TABLE F-continued

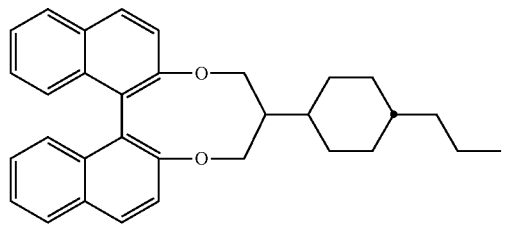

R/S-5011

In a preferred embodiment of the present invention, the liquid crystal media comprise one or more compounds selected from the group of the compounds from Table F.

The liquid crystal media according to the present application preferably comprise two or more, preferably four or more, compounds selected from the group consisting of the compounds from the above tables.

The liquid-crystal media according to the present invention preferably comprise seven or more, preferably eight or more, compounds, preferably compounds having three or more, preferably four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Liquid-crystal mixtures having the composition and properties as indicated in the following tables are prepared and investigated.

The so-called "HTP" denotes the helical twisting power of an optically active or chiral substance in an LC medium (in $\mu m^{-1}$). Unless indicated otherwise, the HTP is measured in the commercially available nematic LC host mixture MLD-6260 (Merck KGaA) at a temperature of 20° C.

Reference Example

The LC host mixture N1 was formulated as follows:

| | |
|---|---|
| GUQGU-3-F | 8% |
| GUQGU-4-F | 6% |
| GUQGU-5-F | 4% |
| GUUQU-3-N | 6% |
| GUQU-3-F | 7% |
| GUQU-4-F | 6% |
| GUQGU-2-T | 12% |
| GUQGU-3-T | 12% |
| GUQGU-4-T | 12% |
| GUQGU-5-T | 12% |
| DPGU-4-F | 8% |
| PGU-5-T | 3% |
| PGU-4-T | 4% |

A polymerisable LC mixture was formulated as follows:

| | |
|---|---|
| Host mixture N1 | 87% |
| R-5011 | 3.8% |
| RM A | 6% |
| Irgacure ® 369 | 0.2% |
| IS 17151 RM B | 3% |

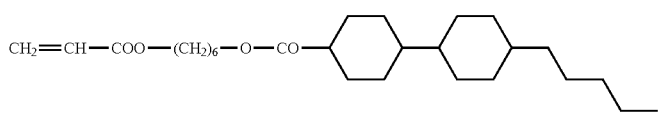

RM A

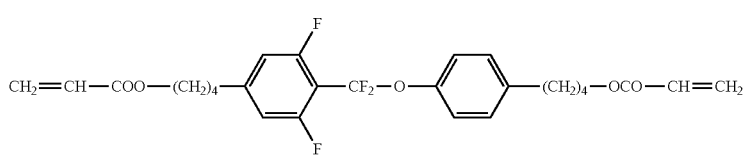

RM B

Experimental Method

The composition above was prepared and homogenised by heating to 80° C. for 10 minutes whilst stirring at 550 rpm.

The composition was used to fill a test cell. The test cell design had no alignment layer and two IPS chrome electrodes on one surface with 10 microns width and 10 microns spacing. The cell gap was 10 microns.

After filling the cell has heated to 65° C. (isotropic phase), then slowly cooled at 1° C. per minute until the polymerisation temperature was reached.

The cell was then exposed to a UV light source. Exposure conditions: Mercury lamp, 3 mW/cm², 390 nm filter for 8 minutes.

The baseline sample had a range of ~1° C. process window.

FIG. 1 shows the performance of the BP sample polymerized at different temperatures. Polymerisation temperatures between 39.7° C. to 40.7° C. give the same performance, however at 41.2° C. the performance has changed indicating a narrow process window.

Example 1

A polymerisable LC mixture was formulated as follows:

| Host mixture N1 | 87% |
| R-5011 | 3.8% |
| RM A | 6% |
| Irgacure ® 369 | 0.2% |
| RM 1 | 3% |

The same experimental method as in the reference example was used. The baseline sample had a range of >2° C. process window.

Figure 2:
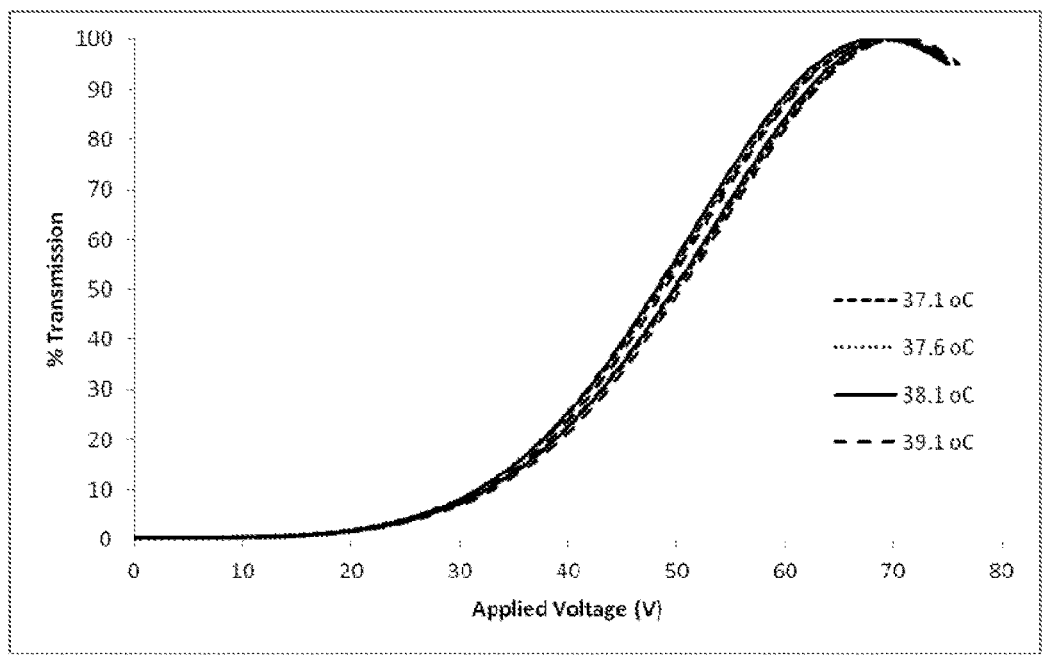
FIG. 2 shows the V-T-curve for a liquid crystal medium according to Example 2 at various polymerisation temperatures.

FIG. 2 shows the performance of the BP sample polymerized at different temperatures. Polymerisation temperatures between 37.1° C. to 39.1° C. give the same performance. Wider process window than in FIG. 1

When an LCD panel is manufactured there is a temperature variation across the panel during processing. If there is too much temperature variation then the transmission will be different in different areas. This non-uniform performance is not desirable.

By having a 2° C. process window, the same performance is achieved across the whole panel and the need for complex temperature control across the whole panel surface is reduced or eliminated (better process).

RM 1

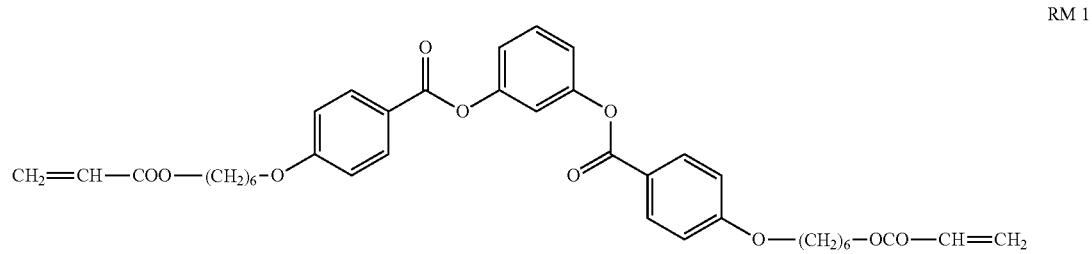

Similar results could be obtained by replacing RM1 with RM2 or RM3 as shown below.

RM 2

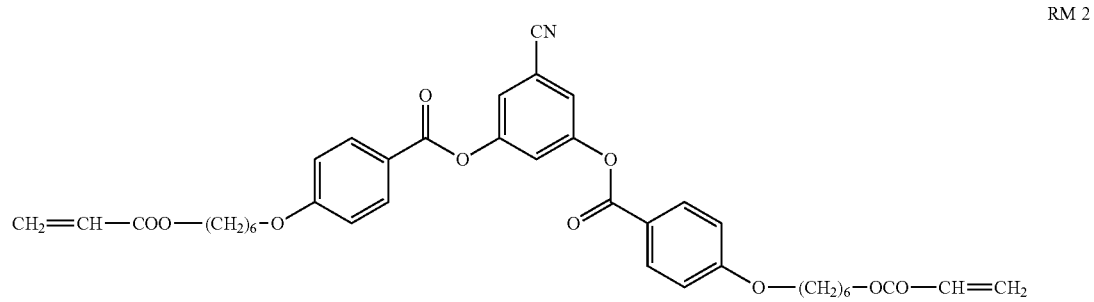

RM 3

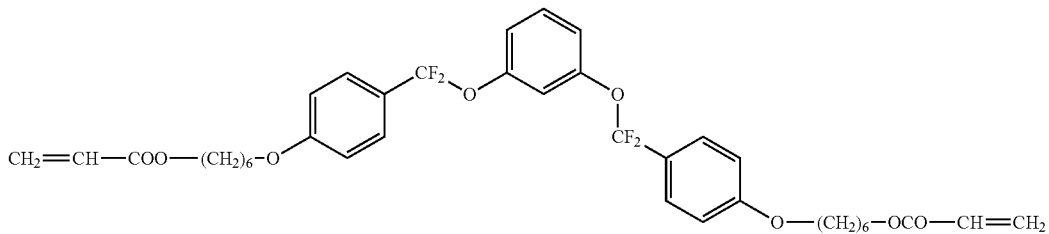

The invention claimed is:
1. A liquid crystal medium comprising one or more compounds selected from the following formulae

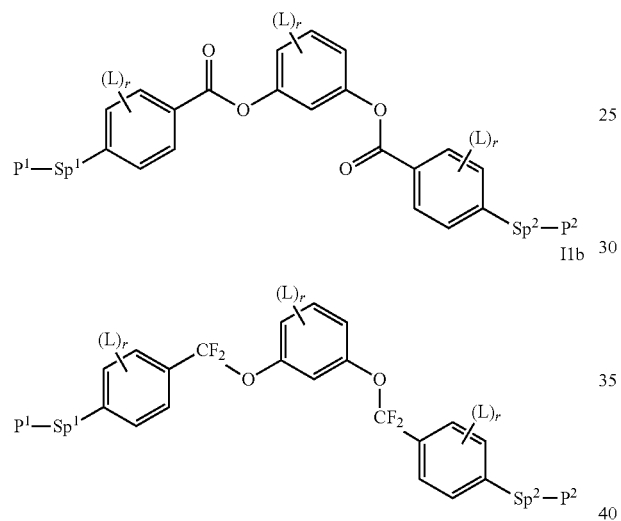

$P^1$, $P^2$ independently of each other denote a polymerisable group, $Sp^1$, $Sp^2$ independently of each other denote Sp''-O— or —O-Sp''

Sp'' is alkylene having 1 to 20 C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^{00}R^{000}$)—, —CO—, —CO—O—, —O—CO—, —O—CO—O—, S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, L denotes $P^1$-, $P^1$—$Sp^1$-, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, optionally substituted silyl, optionally substituted aryl or heteroaryl having 5 to 20 ring atoms, or straight-chain or branched alkyl having 1 to 25, particularly preferably 1 to 10, C atoms, in which, in addition, one or more non-adjacent $CH_2$ groups may each be replaced, independently of one another, by —C($R^{00}$)=C($R^{000}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN, $P^1$ or —$Sp^1$-, $R^{00}$ and $R^{000}$ each, independently of one another, denote H or alkyl having 1 to 12 C atoms, $Y^1$ is halogen, $R^x$ denotes $P^1$, $P^1$—$Sp^1$-, H, halogen, straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are optionally replaced by F, Cl, $P^1$- or $P^1$—$Sp^1$-, optionally substituted aryl, aryloxy, heteroaryl or heteroaryloxy having 5 to 20 ring atoms, r is 1, 2 or 3 and further comprising one or more compounds selected from the group of formulae I-A, I-E, I-N and I-T I-A
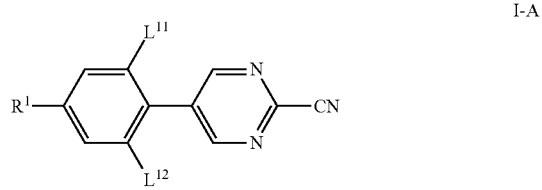

I-E
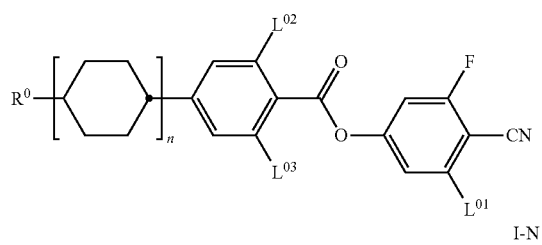

I-N
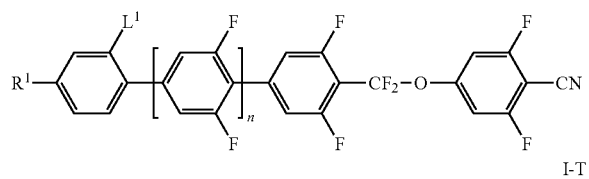

I-T
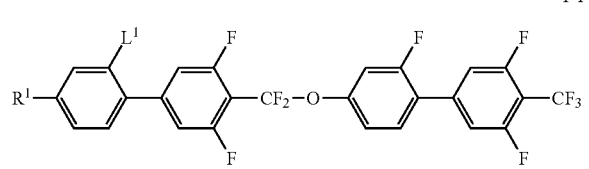

wherein
R⁰ has the meaning of $R^1$,
$R^1$ is alkyl, which is straight chain or branched, preferably has 1 to 20 C-atoms, is unsubstituted, mono- or poly-substituted by F, Cl or CN, preferably by F, and in which one or more CH₂ groups are optionally replaced, in each case independently from one another, by —O—, —S—, —NR⁰¹—, —SiR⁰¹R⁰²—, —CO—, —COO—, —OCO—, —OCO—O—, —S—CO—, —CO—S—, —CY⁰¹=CY⁰²— or —C≡C— in such a manner that O and/or S atoms are not linked directly to one another, preferably n-alkyl or n-alkoxy with 1 to 9 C-atoms, preferably with 2 to 5 C-atoms, alkenyl, alkenyloxy or alkoxyalkyl with 2 to 9 C-atoms, preferably with 2 to 5 C-atoms or halogenated alkyl, halogenated alkenyl or halogenated alkoxy with preferably up to 9 C-atoms, preferably mono fluorinated, di-fluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms, and
$L^1$ to $L^{03}$, $L^1$, $L^{11}$ and $L^{12}$ are independently of one another H or F.

2. The liquid crystal medium according to claim 1, which further comprises one or more compounds of formula II

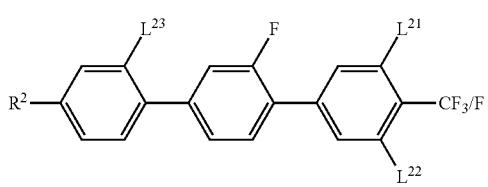

II wherein
$L^{21}$ to $L^{23}$ are, independently of each other, H or F,
$R^2$ is alkyl, which is straight chain or branched, is unsubstituted, mono- or poly-substituted by F, Cl or CN, preferably by F, and in which one or more CH₂ groups are optionally replaced, in each case independently from one another, by —O—, —S—, —NR⁰¹—, —SiR⁰¹R⁰²—, —CO—, —COO—, —OCO—, —OCO—O—, —S—CO—, —CO—S—, —CY⁰¹=CY⁰²— or —C≡C— in such a manner that O and/or S atoms are not linked directly to one another,
$Y^{01}$ and $Y^{02}$ are, independently of each other, F, Cl or CN, and alternatively one of them may be H,
$R^{01}$ and $R^{02}$ are, independently of each other, H or alkyl with 1 to 12 C-atoms.

3. The liquid crystal medium according to claim 1, which further comprises one or more compounds of formula III

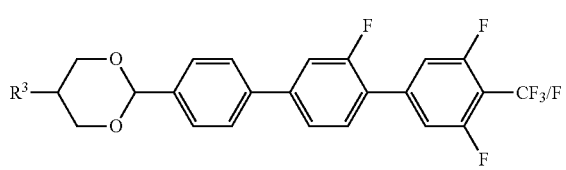

III wherein $R^3$ has the meaning given for $R^1$ in claim 1.

4. The liquid crystal medium according to claim 1, which further comprises one or more compounds selected from the group of compounds of formulae IV and V

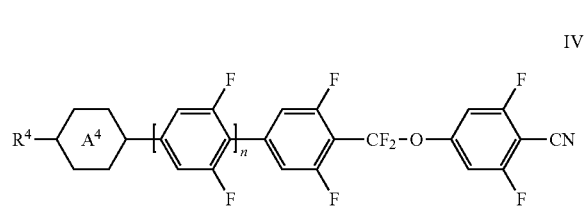

IV

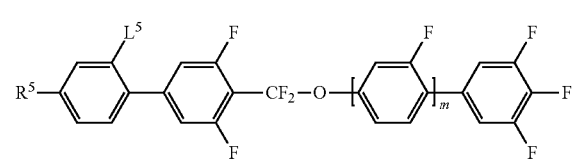

V wherein
$R^4$ and $R^5$ are, independently of each other, alkyl, which is straight chain or branched, preferably has 1 to 20 C-atoms, is unsubstituted, mono- or poly-substituted by F, Cl or CN, preferably by F, and in which one or more CH₂ groups are optionally replaced, in each case independently from one another, by —O—, —S—, —CO—, —COO—, —OCO—, —OCO—O—, —S—CO—, —CO—S- or —C≡C— in such a manner that O and/or S atoms are not linked directly to one another,
$L^5$ is H or F,

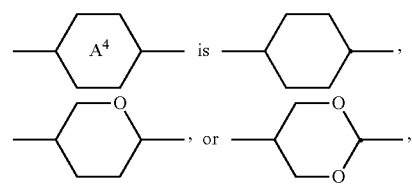

n and m are, independently of one another, 0 or 1.

5. The liquid crystal medium according to claim 1, which comprises one or more chiral dopants.

6. The liquid crystal medium according to claim 1, which is stabilised by the polymerisation of its polymerisable constituents.

7. A method of stabilisation of a liquid crystal medium which comprises subjecting a liquid crystal medium according to claim 1 to polymerisation of its polymerisable constituents.

8. A method which comprises including a liquid crystal medium according to claim 1 in a light modulation element or electro-optical display.

9. A light modulation element or electro-optical display, which comprises a liquid crystal medium according to claim 1.

10. The light modulation element or electro-optical display of claim 9, which is operated at a temperature at which the liquid crystal medium is in an optically isotropic phase.

11. The light modulation element or electro-optical display of claim 9, which is operated at a temperature at which the liquid crystal medium is in a blue phase.

* * * * *